United States Patent
Lohaus et al.

(10) Patent No.: US 6,343,684 B1
(45) Date of Patent: *Feb. 5, 2002

(54) TORSIONAL VIBRATION DAMPER

(75) Inventors: Norbert Lohaus; Andreas Orlamünder, both of Schweinfurt (DE)

(73) Assignee: Mannesmann Sachs AG, Schweinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,670

(22) Filed: Aug. 5, 1997

(30) Foreign Application Priority Data

Aug. 5, 1996 (DE) .......................... 196 31 488
Sep. 6, 1996 (DE) .......................... 196 36 201

(51) Int. Cl.[7] .............................. F16D 3/14; F16D 3/12
(52) U.S. Cl. .......................... 192/213; 464/68
(58) Field of Search ................ 192/213, 212, 192/213.3, 213.31, 214, 214.1, 204; 464/68

(56) References Cited

U.S. PATENT DOCUMENTS

| 4,279,132 A | * | 7/1981 | Lamarche ............... 192/213 X |
| 4,360,352 A | * | 11/1982 | Lamarche ............... 192/213 X |
| 4,381,052 A | * | 4/1983 | Maucher .............. 192/213.3 X |
| 4,401,201 A | * | 8/1983 | Gatewood ............. 192/213.31 |
| 4,406,357 A | * | 9/1983 | Nagano et al. ........ 192/213.31 |
| 4,441,595 A | * | 4/1984 | Lamarche .................. 192/3.29 |
| 4,484,898 A | * | 11/1984 | Kohno ................... 192/213 X |
| 4,526,261 A | * | 7/1985 | Maier et al. ........... 192/213.31 |
| 4,548,309 A | * | 10/1985 | Braun ........................ 192/204 |
| 4,585,427 A | * | 4/1986 | Lamarche ............... 192/213 X |
| 4,687,087 A | * | 8/1987 | Tebbe ................... 192/213.31 |
| 4,700,821 A | * | 10/1987 | Maucher et al. .......... 464/68 X |
| 4,700,822 A | * | 10/1987 | Maucher et al. .......... 464/68 X |
| 4,747,800 A | * | 5/1988 | Takeuchi ................. 464/68 X |
| 4,890,712 A | * | 1/1990 | Maucher et al. .......... 464/68 X |
| 4,906,220 A | * | 3/1990 | Worner et al. ....... 192/214.1 X |
| 4,947,700 A | * | 8/1990 | Kern et al. ............... 464/68 X |
| 5,540,620 A | * | 7/1996 | Haneda et al. .......... 192/213 X |
| 5,558,579 A | * | 9/1996 | Tsuchiya et al. .......... 464/68 X |
| 5,673,778 A | * | 10/1997 | Ament ............. 192/213.31 X |
| 5,725,080 A | * | 3/1998 | Lohaus ..................... 464/68 X |
| 5,848,937 A | * | 12/1998 | Mizukami et al. ...... 192/212 X |

FOREIGN PATENT DOCUMENTS

| DE | 35 27 485 | 2/1986 |
| DE | 39 18 222 | 12/1989 |
| DE | 34 31 809 | 3/1994 |
| EP | 0 062 397 | 10/1982 |
| GB | 2 034 004 | 5/1980 |
| GB | 2 163 831 | 3/1986 |
| GB | 2 299 147 | 9/1996 |
| JP | 1-122537 | 8/1989 |
| JP | 7-14246 | 3/1995 |
| JP | 7-293579 | 11/1995 |

* cited by examiner

Primary Examiner—Charles A Marmor
Assistant Examiner—Roger Pang
(74) Attorney, Agent, or Firm—Cohen, Pontani, Lieberman & Pavane

(57) ABSTRACT

A torsional vibration damper including a disk-shaped first damper part, a second damper part which is rotatable about an axis with respect to the first damper part, and a torsion spring arrangement with at least one torsion spring unit. The at least one torsion spring unit includes at least two springs which are arranged substantially following one another in the circumferential direction. Further, there is at least one intermediate ring element which is rotatable about the axis with respect to the first damper part and the second damper part and with at least one spring contact arm for the at least one torsion spring unit. The spring contact arm extends substantially radially with respect to the axis. The at least one intermediate ring element has a radial movement restraining component for protecting the at least two springs against a movement in the radial outward direction in their end regions facing the at least one spring contact arm.

21 Claims, 16 Drawing Sheets

TORSIONAL VIBRATION DAMPER

BACKGROUND OF THE INVENTION

1. Field of the Invention

The invention is directed to a torsional vibration damper, in particular for a clutch disk for damping torsional vibrations in the drive train of an internal combustion engine. The torsional vibration damper includes a disk-shaped first damper part, a second damper part which is rotatable about an axis with respect to the first damper part, and a torsion bar device or torsion spring device with at least one torsion spring unit.

2. Description of the Prior Art

Torsional vibration dampers of this kind are used, for example, in clutch disks in order to enable damping of torsional vibrations occurring in the power transmission path between an internal combustion engine and the driving wheels of a vehicle. A clutch disk with a known torsional vibration damper is shown in FIG. 12. This known clutch disk 8s comprises a hub 10s which is mountable, for example, on a transmission input shaft so as to be displaceable in the longitudinal direction of the shaft, but is fixed with respect to rotation about an axis A with the transmission input shaft. A hub disk 12s is fixed on the hub 10s, e.g., by welding or the like. A driver disk 14s is arranged in the axial direction on one side of the hub disk 12s. A cover plate 16s is arranged on the opposite side of the hub disk 12s and is fixed with the driver disk 14s by a plurality of bolt elements 18s. The driver disk 14s is connected in the radial inner region with a bearing ring 20s so as to be fixed with respect to rotation relative thereto. The bearing ring 20s is rotatably supported on the hub 10s. A plate spring 22s is arranged between the hub disk 12s and the cover plate 16s and pretensions the input part of the clutch disk 8s in the axial direction, which input part is formed of the driver disk 14s and cover plate 16s, so that the bearing ring 20s contacts the hub disk 12s with pretensioning, possibly with the intermediary of friction linings or the like. In a radial outer region, the driver disk 14s is coupled with friction linings 24s which can be clamped in a manner known per se between a flywheel and a contact pressure plate of a motor vehicle clutch for transmitting torque.

Circumferentially extending spring windows 26s, 28s, 30s are provided in the hub disk 12s, the driver disk 14s and the cover plate 16s. A spring 32s is arranged in the spring windows 26s, 28s, 30s. The ends of the spring 32s contact control edges 34s, 36s, 38s of the hub disk 12s or of the driver disk 14s and the cover plate 16s, the ends being located opposite one another in the circumferential direction. Due to the spring 32s, the hub disk 12s is pretensioned in a predetermined rest position with respect to the driver disk 14s and the cover plate 16s. When torque occurs, the spring 32s is compressed so that rotation can occur between the hub disk 12s and the driver disk 14s and cover plate 16s. The spring 32s cooperates with the bearing ring 20s which contacts the hub disk 12s accompanied by pretensioning in order to damp torsional vibrations in a manner known per se. In clutch disks of this type, a plurality of springs are arranged in succession in the circumferential direction in windows provided in a suitable manner, although this is not shown in FIG. 12.

The problem in torsional vibration dampers of this kind is that the springs must have a sufficiently large spring constant on the one hand and an adequate spring length on the other hand in order to provide good and defined damping characteristics. However, if the spring length is too great, the springs tend to expand outward in their radial center regions due to their pretensioning. In so doing, they contact the respective outer rims of the spring windows in the hub disk or the driver disk and cover plate, so that the friction in the torsional vibration damper constructed in this way is appreciably increased due to this contact. Since this frictional force depends upon the extent of compression of the spring, its contribution to the friction moment provided between the hub disk and the driver disk and cover plate can be calculated only with difficulty and this frictional force should accordingly be prevented.

A torsional vibration damper with an amplitude-dependent friction moment is known from the German Patent DE 34 31 809. In this known torsional vibration damper there is also a hub disk arranged in the axial direction between a driver disk and a cover plate. Spring windows for receiving springs are again formed in the hub disk and the driver disk and cover plate. In particular, for this purpose, two springs following one another in the circumferential direction are arranged in the corresponding spring windows in the hub disk and the driver disk and the cover plate and accordingly form a torsion spring unit. The torsion spring unit constructed in this way again contacts control edges of the spring windows in the hub disk or the driver disk and the cover plate by its ends which are arranged at a distance from one another in the circumferential direction. A spring contact arm of an intermediate disk is arranged between the ends of the spring which face one another. In order to provide the amplitude-dependent friction moment in this known torsional vibration damper, a first friction device is provided, on the one hand, which acts directly between the hub disk and the driver disk and cover plate. On the other hand, a second friction device is provided which acts between the intermediate disk and the driver disk. Accordingly, one of the two springs of the torsion spring unit is bridged by the second friction arrangement depending upon the torque transmission direction.

Another problem in this known torsional vibration damper is that the torsion spring unit formed by the two springs contacts an outer edge of the spring window formed in the hub disk or the driver disk and cover plate substantially along its entire outer circumferential surface, especially due to its pretensioning. In this known torsional vibration damper, also, this leads to the disadvantage that an additional friction moment which can be calculated only with difficulty is generated in the torsional vibration damper due to the pretensioning of the torsion spring unit which accordingly occurs in the radial outward direction.

SUMMARY OF THE INVENTION

Accordingly, it is an object of the present invention to provide a torsional vibration damper, especially for a clutch disk for damping torsional vibrations in the drive train of an internal combustion engine, in which the occurrence of unintended friction moments is prevented.

In accordance with a first aspect of the present invention, this object is met by a torsional vibration damper, especially for a clutch disk for damping torsional vibrations in the drive train of an internal combustion engine, comprising a disk-shaped first damper part, a second damper part which is rotatable about an axis with respect to the first damper part, and a torsion spring device with at least one torsion spring unit. The at least one torsion spring unit comprises at least two springs which are arranged substantially following one another in the circumferential direction. Ends of the torsion spring unit, which are directed opposite to one another in the circumferential direction, cooperate with the first damper part and second damper part with respect to operation for damping torsional vibrations. The damper further includes at least one intermediate ring element which is rotatable about the axis with respect to the first damper part and the second damper part and with at least one spring contact arm for the at least one torsion spring unit. The spring contact arm extends substantially radially with respect to the axis and is arranged in the circumferential direction between ends of the at least two springs of the at least one torsion spring unit, which ends face one another. The at least one intermediate ring element further comprises radial movement restraining means for protecting the at least two springs against movement in the radial outward direction in their end regions facing the at least one spring contact arm.

In the torsional vibration damper according to the invention, the torque between the first damper part and the second damper part is transmitted by a torsion spring unit formed of at least two springs. This means that the torsion spring unit has a distinctly greater length and can accordingly also provide better damping characteristics compared with known springs which are often constructed with only a short length due to the problems described above. However, due to the use of shorter springs which together can form a torsion spring unit, the problem of the deflection of the springs in the radial outward direction can be prevented to a great extent. Additional assistance is provided in that the springs of the torsion spring unit contact the spring contact arm of the intermediate ring element by their end regions which face one another and are prevented from executing a deflecting movement radially outward by the radial movement restraining means. This means that each of the springs of the torsion spring unit contacts either the first damper part or the second damper part or the spring contact arm of the intermediate ring element only in the region of its ends which are oppositely directed in the circumferential direction. An outwardly directed deflecting movement of the individual springs and the frictional force which occurs in so doing is therefore prevented by contact at the first damper part and/or second damper part.

According to a second aspect of the present invention, a torsional vibration damper, especially for a clutch disk for damping torsional vibrations in the drive train of an internal combustion engine, comprises a disk-shaped first damper part, a second damper part which is rotatable about an axis with respect to the first damper part, and a torsion spring device with at least one torsion spring unit. The at least one torsion spring unit comprises at least three springs which are arranged substantially so as to follow one another in the circumferential direction. Ends of the torsion spring unit which are oppositely directed in the circumferential direction cooperate with the first damper part and the second damper part with respect to operation for damping torsional vibrations. The damper further includes at least two intermediate ring elements which are rotatable about the axis with respect to the first damper part and second damper part and with respect to one another. Each of the ring elements has at least one spring contact arm for the at least one torsion spring unit, which spring contact arm extends substantially radially with respect to the axis. A spring contact arm of an intermediate ring element is arranged in each instance in the circumferential direction between ends of successive springs of the at least one torsion spring unit, which ends face one another.

In such a configuration of the torsional vibration damper according to the invention, the total spring path of every torsion spring unit can be increased by providing more than two springs. However, this does not result in a lengthening of the springs; rather the relatively short springs are supported against one another with the intermediary of the spring contact arms of the respective intermediate ring elements. Accordingly, the springs are again prevented from excessive bulging in the radial outward direction in their center regions due to centrifugal force occurring during operation and are accordingly prevented from coming into contact with other structural component parts.

In a further embodiment of the torsional vibration damper according to the invention, each intermediate ring element further comprises radial movement restraining means for securing the springs against a radially outward movement in their end regions facing the respective spring contact arm.

In still another embodiment of the present invention, every intermediate ring element comprises an inner ring portion arranged radially inside the at least one torsion spring unit or/and an outer ring portion arranged radially outside of the at least one torsion spring unit. The at least one spring contact arm extends away from the inner and outer ring portion substantially in the radial direction.

Control edges for the contact of the springs are advantageously provided at the ends of the at least one spring contact arm at every intermediate ring element, which ends are oppositely directed in the circumferential direction. For this purpose, the radial movement restraining means can be formed by projections which extend away substantially in the circumferential direction from the at least one spring contact arm in a radially outer end region of the control edges.

In order to ensure that the spring force of the at least one torsion spring unit is transmitted in a suitable manner in a plane orthogonal to the axis and such that no tilting moment is generated between the individual structural component parts, in another embodiment of the invention a spring window is provided in the first damper part for the at least one torsion spring unit. A corresponding spring window for the at least one torsion spring unit is provided in the second damper part. Control edges for the contact of the ends of the torsion spring unit which are oppositely directed in the circumferential direction are formed at the ends of the spring window in the first damper part and in the second damper part, which ends are oppositely directed in the circumferential direction. The at least one spring contact arm of every intermediate ring element lies with at least some areas of its radial portion in the axial direction, which radial portion is provided for contacting the springs, in a common plane orthogonal to the axis with the control edges formed at the spring window of the second damper part. For example, every spring contact arm is curved in its region which is connected with the inner ring portion and/or outer ring portion such that the inner ring portion and/or outer ring portion are/is displaced in the axial direction with respect to the second damper part and does not overlap the latter axially.

If the inner ring portion and/or outer ring portion can be brought into contact with an axial lateral surface of the second damper part, the intermediate rings can be secured against axial displacement by means of the respective ring portions in cooperation with the second damper part.

In order to make use of the entire radial extension of the respective spring window in the second damper part for the springs to contact the respective spring contact arms by resting against the latter, in a further embodiment the curved region of every spring contact arm is constructed near radial inner ends regions or radial outer end regions of the spring window in the second damper part. Accordingly, further, radial movement restraining means are formed for the intermediate ring elements by the curved regions which are formed near the respective end regions of the spring window and which contact the damper part when the respective spring arms and accordingly the intermediate ring elements are displaced radially.

Further, when the radial extension of every intermediate ring element is smaller than the radial extension of the spring window, it is ensured that the intermediate ring elements take up as little installation space as possible so that more space is available for other parts. Additionally, interference between the intermediate ring elements and other structural component parts can be prevented.

It is advantageous, particularly when a plurality of intermediate ring elements are provided, if the curved regions of a spring contact arm of a first intermediate ring element are curved axially in the opposite direction with respect to the curved regions of a spring contact arm of another intermediate ring element. In a configuration of this kind, the respective inner and outer ring portions of the intermediate ring elements contact sides which are directed opposite one another in the axial direction with respect to the second damper part, so that the intermediate ring elements cannot interfere with one another.

Alternatively or in addition, the curved regions of a spring contact arm of a first intermediate ring element can be curved axially in the same direction with respect to the curved regions of a spring contact arm of another intermediate ring element. This is advantageous particularly when more than two, e.g., three, intermediate ring elements are provided. In particular, the radial extension of one of the intermediate ring elements can then be smaller than that of the other respective intermediate ring element such that the outer ring portion of the intermediate ring element is arranged with the smaller radial extension radially inside of the outer ring portion of the other respective intermediate ring element and/or the inner ring portion of the intermediate ring element is arranged with the smaller radial extension radially outside of the inner ring portion of the other respective intermediate ring element. As a result, the respective intermediate ring elements whose curved regions are curved on the same side are nested radially one inside the other, so that even when a plurality of intermediate ring elements are provided, e.g., three intermediate ring elements, no interference can occur.

In order to be able to make very effective use of the circumferential length of every torsion spring unit, it is suggested that every intermediate ring element have only one outer ring portion and that every spring contact arm be constructed as a contact wedge which substantially tapers to a point radially inwards. In a configuration of this kind, every spring contact arm constructed as a contact wedge is formed so that it tapers to a point in its radial inner region, since it need not be connected with an inner ring portion. This means that the circumferential extension of every spring contact arm can be reduced so that control edges which are provided at the latter lie closer to one another in the circumferential direction. Consequently, there is more installation space available for springs of every torsion spring unit and the effective spring length can accordingly be lengthened.

Also, in order to be able to ensure a reliable and trouble-free operation in a configuration of this type it is suggested that the outer ring portion be reinforced.

In an advantageous manner, every intermediate ring element comprises at least the inner ring portion and the inner ring portion is arranged adjacent to the radial inner region of the damper part in the axial direction.

In a further embodiment of the invention, every intermediate ring element is curved in the region of the at least one spring contact arm, from the inner ring portion radially outward in the axial direction toward the second damper part. When the second damper part is constructed so as to be substantially planar, the second damper part can be punched, e.g., as a metal plate or the like, without the need for additional forming processes.

Alternatively, the second damper part can be curved radially outward in the axial direction toward the at least one intermediate ring element in its radial region corresponding to the at least one spring contact arm. The contact points of the springs at the second damper part and the spring contact arm can accordingly be displaced in an improved manner in a common plane orthogonal to the axis.

Alternatively, it is also possible that the at least one intermediate ring element is constructed in a substantially planar manner and that the second damper part is curved radially outward in the axial direction toward the intermediate ring element in its radial region corresponding to the spring contact arm.

In order to provide a symmetrical torque transmission between the first damper part and second damper part, the first damper part comprises a first disk element which is arranged adjacent to the second damper part in axial direction and a second disk element which is arranged in axial direction on the side directed opposite to the first disk element with respect to the second damper part and is preferably fixedly connected in a radially outer region with the first disk element. In so doing, the inner ring portion and/or the outer ring portion of each intermediate ring element is axially arranged between the second damper part and the first disk element or the second disk element of the first damper part. In a configuration of this type, an axial guiding of the at least one intermediate ring element is provided at the same time.

Further, the first disk element can be connected in a radially inner region with a bearing ring element so as to be fixed with respect to rotation relative thereto. The inner ring portion of the at least one intermediate ring element is arranged between the first disk element and the second damper part.

In the normal operating state, the at least one intermediate ring element is held in a centered manner with respect to the first damper part and the second damper part and the axis by means of the springs of the at least one torsion spring unit and the occurring spring force deflecting action in the region of the spring contact arm. The springs contact the at least one spring contact arm and the radial movement restraining means. However, in order to prevent a lateral deflection of the at least one intermediate ring element in the event of malfunction, e.g., a damaged spring, the bearing ring element has a ring portion extending axially between the first disk element and the second damper part. The ring portion forms an emergency guide for the inner ring portion of the at least one intermediate ring element at its outer circumferential surface.

To provide a defined torsional vibration damping force, a friction arrangement can be provided which acts between the second damper part and the first damper part for providing the torsional vibration damping frictional force. For this purpose, the bearing ring element, for instance, can contact the second damper part in the axial direction, possibly with the intermediary of the friction lining means, and a spring arrangement provided between the second damper part and the second disk element can pretension the bearing ring element in the direction of the second damper part. Alternatively, the second disk element, possibly with the intermediary of friction lining means, can contact the second damper part in the axial direction. A spring arrangement provided between the second damper part and the bearing ring pretensions the second disk element in the direction of the second damper part.

In a particularly simple and economical embodiment, the spring arrangement comprises a spring element formed by a plate spring, a ring spring, a wave spring or the like.

For this purpose, an additional defined friction moment can be provided if the spring element contacts the second damper part in a radial inner region and engages with at least one axially directed projection in a corresponding recess in the radial inner region of the second damper part. This means that the spring element is fixed with respect to rotation relative to the second damper part and provides a defined friction moment when torsional vibration occurs with corresponding relative rotation between the first damper part and the second damper part by means of the friction contact with the first damper part.

To prevent the springs of the at least one torsion spring unit from being fully compressed, i.e., to their minimum length, rotational path limiting means are provided for limiting the rotational path between the first damper part and the second damper part. For this purpose, the rotational path limiting means at the first damper part and at the second damper part can comprise stop means acting in the circumferential direction. The stop means at the first damper part can act directly on the stop means at the second damper part.

Alternatively, first stop means cooperating with the stop means at the first damper part can be provided at every intermediate ring element and second stop means cooperating with the stop means at the second damper part and/or with the stop means at another intermediate ring element can be provided. This is especially advantageous when the springs of the at least one torsion spring unit have different spring constants. In such a case, a stepped spring force can be provided by the torsion spring unit.

In so doing, the first and second stop means of every intermediate ring element can be formed, for example, by substantially radially directed stop faces which are formed at projections that, per se, extend away from the at least one spring contact arm in the circumferential direction.

In a particularly simple construction, the stop means at the first damper part is formed by at least one pin element connecting the first disk element with the second disk element. Accordingly, the use of additional structural component parts for forming the stops is avoided.

The stop means at the second damper part can be formed by substantially radially extending stop faces provided in a radially outer region of the second damper part.

The springs of the at least one torsion spring unit can have the same spring constants. Alternatively, the springs of the at least one torsion spring unit can have different spring constants, so that a stepped spring response of the at least one torsion spring unit can be obtained as was mentioned above.

In modern automotive engineering, clutch units comprising a flywheel, clutch disk, contact pressure plate assembly and clutch casing are often produced and sold in a preassembled manner. Such clutch units must then be attached to an end face of a crankshaft by means of screw bolts which penetrate the flywheel. In order to enable screws to be introduced through the flywheel through a clutch unit of this type which can contain a torsional vibration damper according to the invention, e.g., as a clutch disk, the spring window in the second damper part is constructed to extend farther radially inward than the corresponding spring window in the first and second disk parts of the first damper part. Axial through-openings which are aligned in the axial direction are provided in the first and second disk parts in a region corresponding to the portion of the spring window in the second damper part, which portion is lengthened radially inward. This is advantageous particularly in relation to the torsional vibration damper according to the invention, since the at least one torsion spring unit can be lengthened radially inward due to the construction of the at least one torsion spring unit with short springs and can accordingly extend in the radial region in which the screw bolts are provided for fastening the flywheel to the crankshaft.

The torsional vibration damper according to the invention can be constructed in such a way that the first damper part or the second damper part comprises an input part of a clutch disk, especially a driver disk, and so that the other respective part comprises an output part of a clutch disk, especially a hub disk.

In an embodiment which is simple and economical to produce, the part of the first damper part and second damper part forming the output part can be fixedly connected with a hub, preferably by welding or the like. The bearing ring can then be mounted on the hub so as to be rotatable about the axis.

According to a third aspect of the present invention, a torsional vibration damper, especially for a clutch disk for damping torsional vibrations in the drive train of an internal combustion engine, comprises a disk-shaped first damper part, a second damper part which is rotatable about an axis with respect to the first damper part, and a torsion spring device with at least one torsion spring unit. The at least one torsion spring unit comprises at least two springs which are arranged substantially so as to follow one another in the circumferential direction. The ends of the torsion spring unit, which are oppositely directed in the circumferential direction, cooperate with the first damper part and the second damper part with respect to operation for damping torsional vibrations. At least one intermediate ring element is rotatable about the axis with respect to the first damper part and the second damper part. At least one spring contact arm for the at least one torsion spring unit extends substantially radially with respect to the axis. The at least one spring contact arm is arranged in the circumferential direction between ends of at least two springs of the at least one torsion spring, which ends face one another. The disk-shaped first damper part comprises a first disk element and a second disk element which is arranged at a distance axially from the first disk element and is fixedly connected therewith. The second damper part is constructed substantially in the manner of a disk and is arranged between the first disk element and the second disk element in the axial direction. The at least one intermediate ring element lies in a common plane with the second damper part, which plane lies substantially orthogonal to the axis, at least in the region of its spring contact arm for every torsion spring unit.

A construction of this kind ensures that the force transmission between the second damper part and the spring contact arm of every intermediate ring element, which spring contact arm is associated with every torsion spring unit, occurs in a plane orthogonal to the axis, i.e., the occurrence of tilting moments is extensively prevented in every torsion spring unit while taking up little space in the axial direction.

A torsional vibration damper which is constructed in a particularly simple manner and takes up only little axial installation space can be obtained when ever intermediate ring element is formed only by a single disk part.

The quantity of intermediate ring elements which are rotatable relative to one another is advantageously smaller by one than the quantity of springs of each torsion spring unit, and each intermediate ring element then advantageously has a spring contact arm for every torsion spring unit. Since the quantity of limiting surfaces formed between the springs of a torsion spring unit is smaller by one than the quantity of respective springs, precisely one intermediate ring element is accordingly provided with its associated spring contact arm for every limiting surface. Accordingly, the quantity of structural component parts can be kept as low as possible by more than two springs for every torsion spring unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

Figure 1:
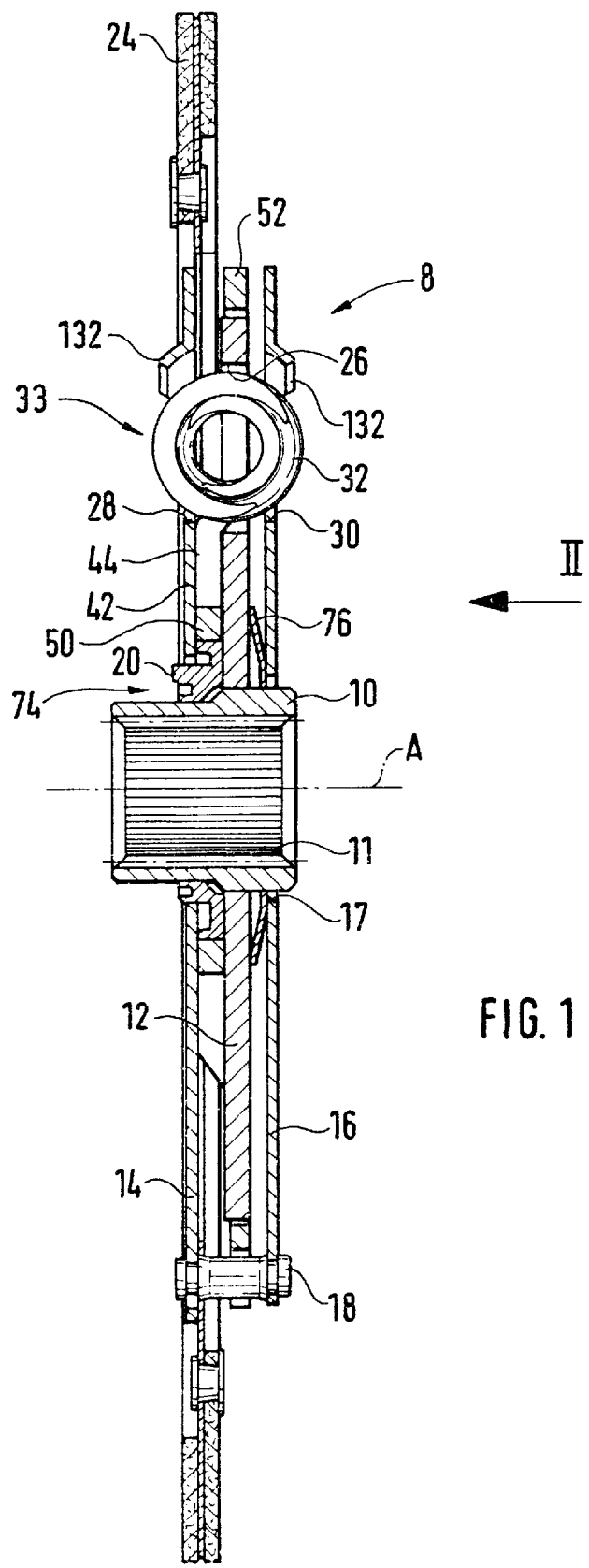
FIG. 1 shows a section through a torsional vibration damper according to the invention along the line I—I in FIG. 3.

FIG. 1 shows a sectional view of a clutch disk 8 which contains a torsional vibration damper according to the invention. The clutch disk 8 comprises a hub 10 which, for example, is displaceable in the longitudinal direction of an axis A on a gear unit input shaft (not shown). However, the hub 10 is mounted so as to be rotatable with the input shaft. For this purpose, the hub 10 has a toothing 11 at its inner circumferential surface. A hub disk 12 is connected with the hub 10 so as to be fixed with respect to rotation relative to it. The hub disk 12 can be connected with the hub 10, e.g., by welding or the like, at its radial inner region. The hub disk 12 is formed of an individual structural component part which can be produced by punching, for example.

A driver disk 14 is arranged at one side of the hub disk 12 in the direction of axis A. The driver disk 14 is connected with a bearing ring 20 in a radial inner region so as to be fixed with respect to rotation relative to it. The bearing ring 20 is in turn arranged on the hub 10 so as to be rotatable. In a radial outer region, the driver disk 14 is fixedly connected with friction linings 24 which can be clamped between corresponding friction linings of a clutch which are arranged at a flywheel or at a contact pressing plate (not shown in the figures). Accordingly, by means of the clamping of the friction linings 24 between the flywheel and the contact pressure plate, the clutch disk 8 is connected with the flywheel, and accordingly with a crankshaft of an engine, so as to be fixed with respect to rotation relative to it.

A cover plate 16 is arranged at the side directed opposite to the driver disk 14 in the direction of the axis A with respect to the hub disk 12. The cover plate 16 is fixedly connected in its radial outer region with the driver disk 14 by a plurality of pins arranged so as to be distributed in the circumferential direction. In its radial inner region, the cover plate 16 has a recess 17 such that it forms a radial distance relative to the outer circumferential surface of the hub 10.

Figure 2:
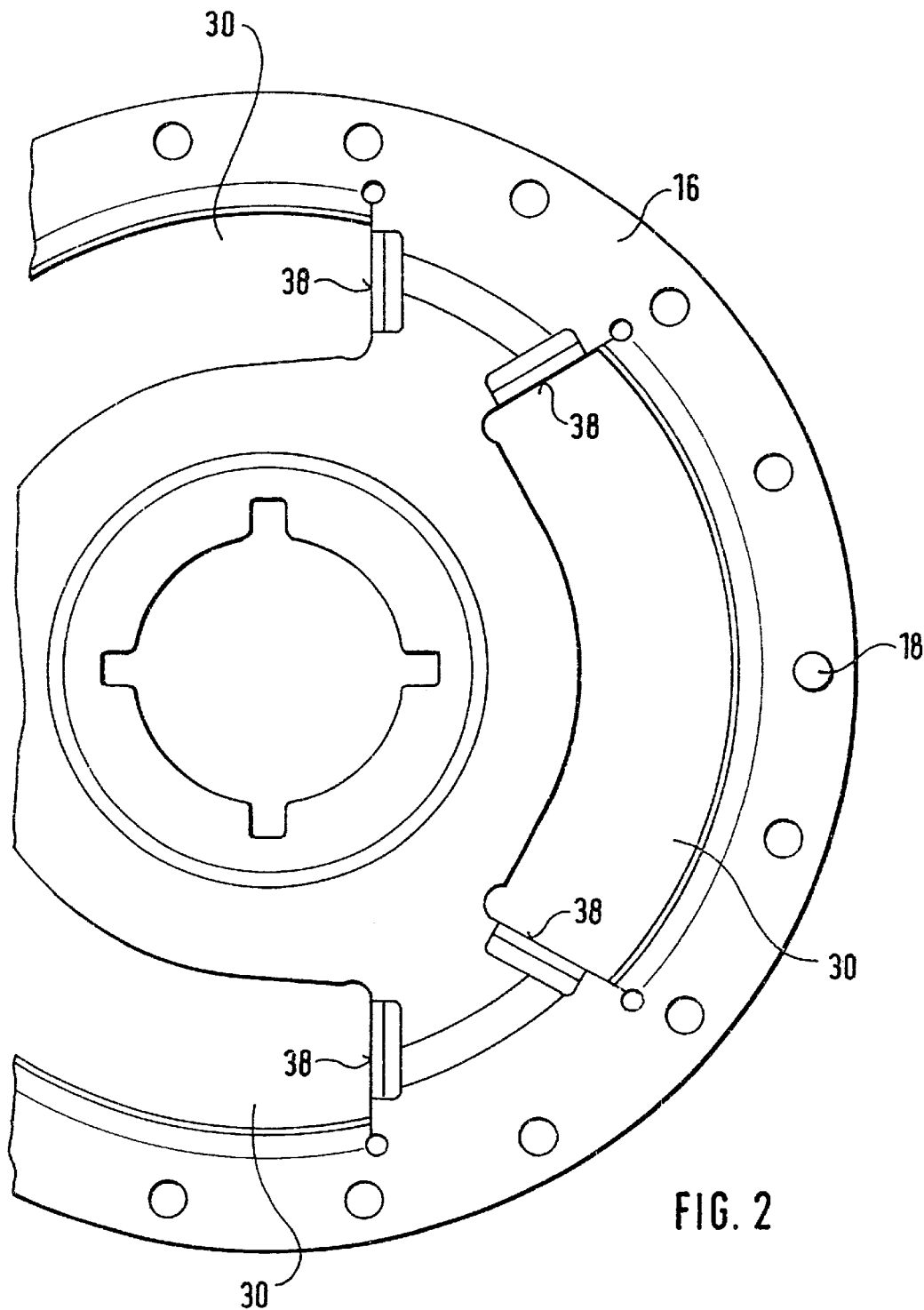
FIG. 2 is a side view of a cover plate in the direction of arrow II in FIG. 1, which cover plate is used in the torsional vibration damper according to the invention.
Figure 3:
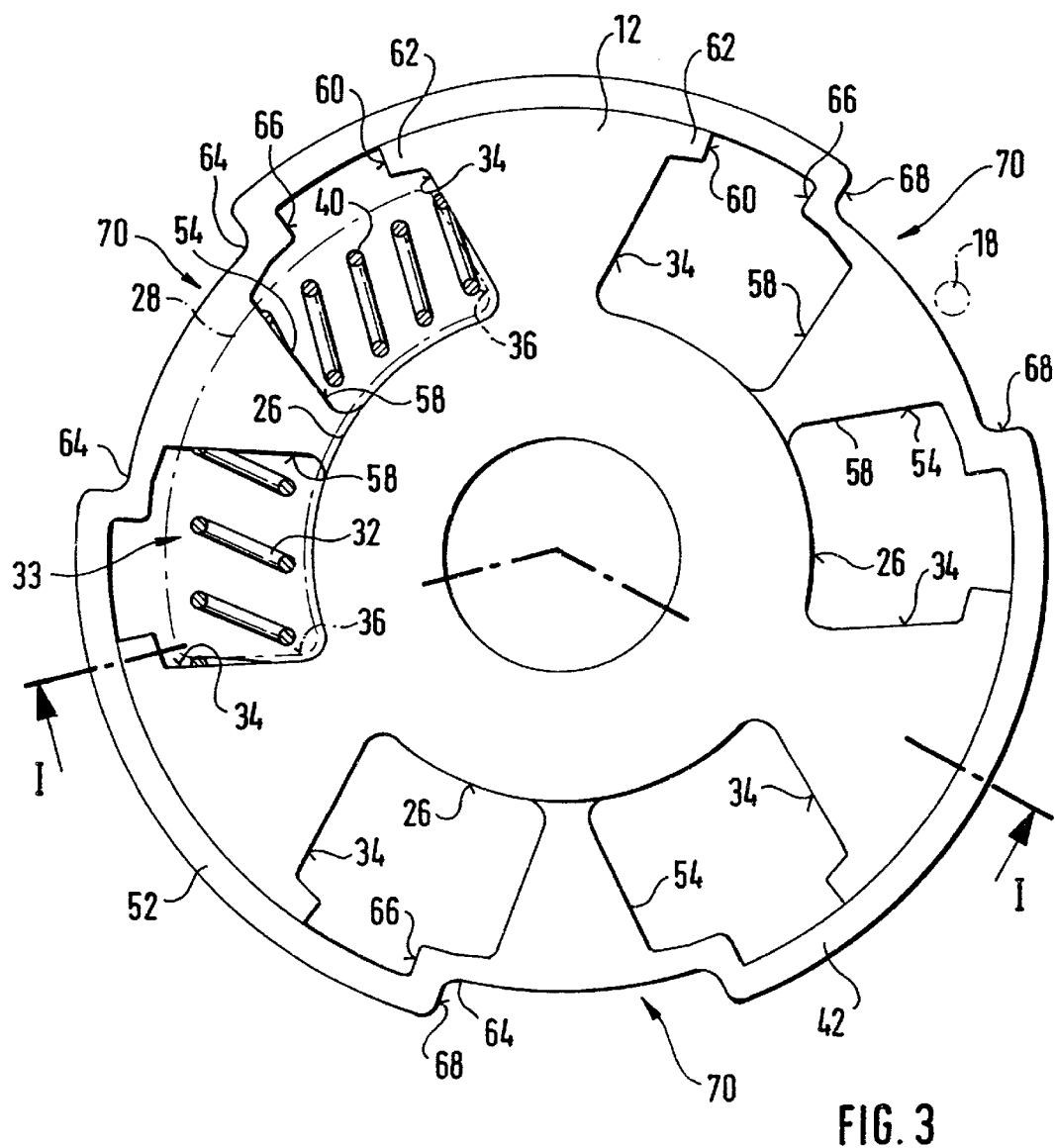
FIG. 3 shows a schematic simplified top view of the torsional vibration damper according to the invention which serves to illustrate the principle of the present invention.
Figure 5:
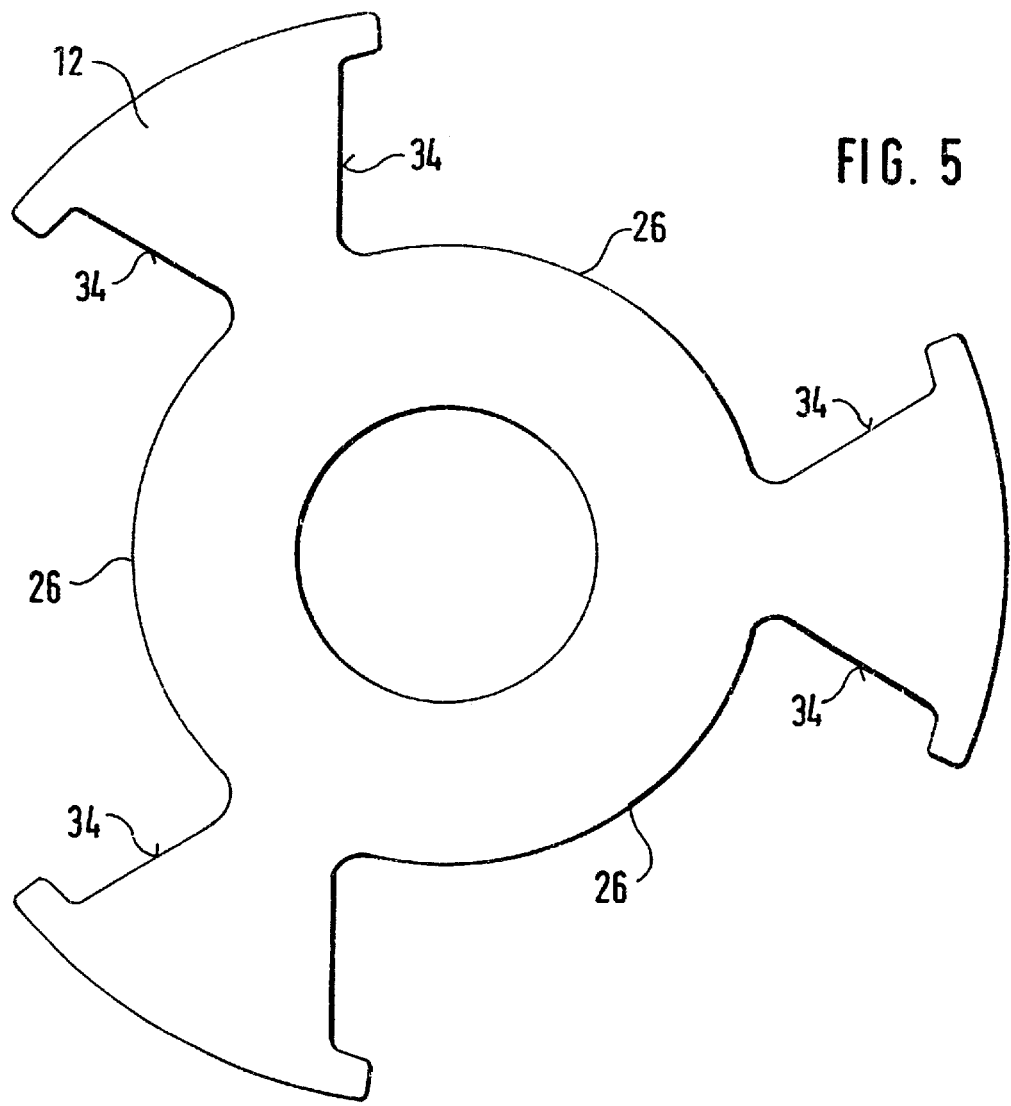
FIG. 5 shows a view of the hub disk used in the torsional vibration damper according to the invention.

Spring windows 26, 28 and 30 are arranged on the hub disk 12, the driver disk 14 and the cover plate 16 (see FIGS. 2, 3 and 5). Springs 32, 40 are arranged in the spring windows 26, 28, 30 in a manner to be explained more fully hereinafter. The springs 32, 40 form a torsion spring unit 33 and contribute to the torsional vibration damping between the hub disk 12 on the one hand and the driver disk 14 and cover plate 16 on the other hand. As will be seen from FIGS. 2, 3 and 5, three spring windows 26, 28, 30 which follow one another in the circumferential direction are provided in the hub disk 12, the driver disk 14 and the cover plate 16 to receive the springs 32, 40. This results in a symmetrical distribution of the force effect of the springs 32, 40 about the axis A.

Each of the spring windows 26, 28, 30 in the hub disk 12 and driver disk 14 and cover plate 16 has control edges 34, 36 and 38 in its opposite ends in the circumferential direction for contacting the springs 32, 40.

Figure 4:
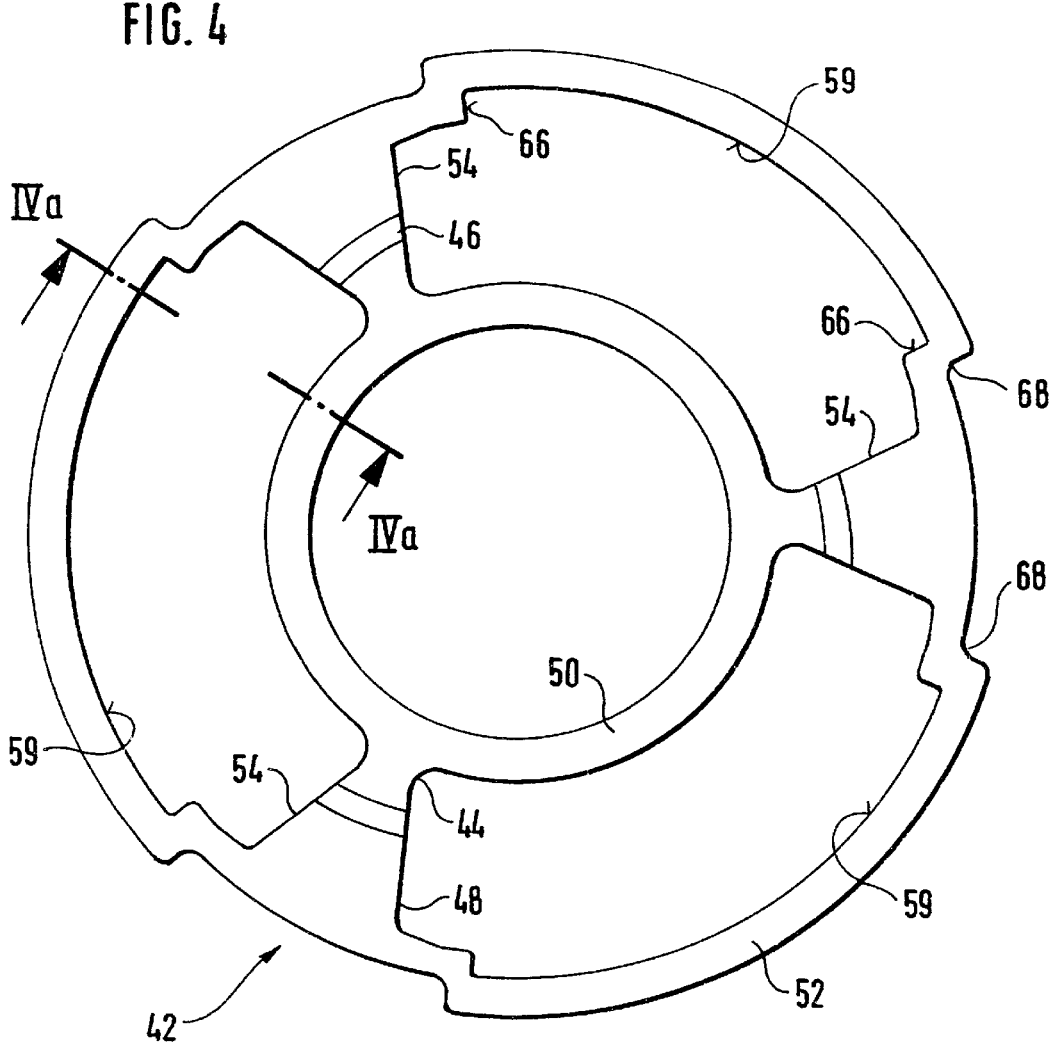
FIG. 4 shows a view of the intermediate ring element of the torsional vibration damper according to the invention.
Figure 4A:
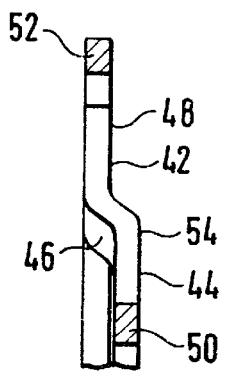
FIG. 4a shows a section along line IVa—IVa in FIG. 4.

Further, as will be seen in FIGS. 1 and 3, an intermediate ring 42 is provided which is shown in detail in FIGS. 4 and 4a. A radial inner portion 44 of the intermediate ring 42 extends in the axial direction only between the hub disk 12 and the driver disk 14. In a middle or curved region 46, the intermediate ring 42 is curved outward radially in the direction of the hub disk 12. In a radial outer region 48, the intermediate ring 42 extends radially outward in the axial direction in alignment with the spring windows 26 in the hub disk 12. As will be seen especially from FIG. 4, the intermediate ring 42 is formed by an inner ring portion 50 and an outer ring portion 52 between which three spring contact arms 54 extend in the embodiment shown in the figure. In particular, the curvature of the intermediate ring 42 is provided in each instance in a radial center region of the spring contact arms 54. The intermediate ring 42 is substantially freely rotatable about axis A with respect to the hub disk 12 and the driver disk 14 and the cover plate 16.

Spring windows 59 are formed in the intermediate ring 42 between the spring contact arms 54 following one another in the circumferential direction and serve to receive the springs 32, 40 in a manner to be described hereinafter.

As will be seen especially from FIG. 3, the intermediate ring 42 is arranged in such a way with respect to the hub disk 12 that the spring contact arms 54 of the intermediate ring 42 extend substantially in a middle region of the spring windows 26 in the hub disk 12 in the circumferential direction. Since the spring windows 28, 30 in the driver disk 14 and the cover plate 16 are aligned with the spring windows 26 in the hub disk 12 in the circumferential direction, the spring contact arms 54 of the intermediate ring 42 likewise extend in the circumferential direction in a middle region with respect to the spring windows 28, 30 in the driver disk 14 and the cover plate 16. Each spring contact arm 54 has, in its end regions which are directed opposite to one another in circumferential directions, control edges 58 at which ends of the springs 32, 40 can make contact. As will be seen especially in FIG. 3, the construction is so configured that each of the springs 32, 40 contacts the control edges 34, 36, 38 of the hub disk 12, the driver disk 14 and the cover plate 16 by one of its ends and contacts the control edges 58 of the intermediate ring 52 with the other end.

Further, stop means are provided at the hub disk 12, the intermediate ring 42 and the driver disk 14 and the cover plate 16 for forming rotational path limiting means between the hub disk 12 and the driver disk 14 and cover plate 16. These stop means comprise stop faces 60 which are provided at the hub disk 12 in a region radially outside of the control edges 34 of same. The stop faces 60 are provided at projections 62 of the hub disk 12 extending in the circumferential direction. In a corresponding manner, stop faces 66 are formed radially outside of the control edges 58 of the intermediate ring 42 at projections 64 which extend in the circumferential direction and form a part of the outer ring portion 52, these stop faces 66 being positioned so as to cooperate with the stop faces 60 at the hub disk 12. Also, stop faces 68 are formed at the projections 64 extending in the circumferential direction of the spring contact arms 54. The stop faces 68 are directed opposite to the associated stop faces 66 in the circumferential direction, a circumferentially extending recess 70 being formed therebetween for one of the pins 18 by which the driver disk 14 is fixedly connected with the cover plate 16. Although only one such pin 18 is shown in FIG. 3, a pin of this type can, of course, be provided in every recess 70.

Further, the clutch disk 8 is provided with a friction arrangement 74 which contributes to the damping of torsional vibrations. As will be seen in FIG. 1, the friction arrangement 74 comprises the bearing ring 20 and a plate spring 76. In the construction according to FIG. 1, the plate spring 76 is arranged on the opposite side of the hub disk 12 with reference to the bearing ring 20 and acts in a pretensioning manner between the hub disk 12 and cover plate 16. The driver disk 14 is accordingly pressed against the hub disk 12 via the bearing ring 20 in the axial direction by the pretensioning action of the plate spring 76, wherein a corresponding friction force is generated. By providing friction linings or friction elements at the bearing ring 20 on the one hand and/or at the hub disk 12 on the other hand, it is possible to adjust the friction forces occurring between the bearing ring 20 and the hub disk 12 in a suitable manner. It is self-evident for one skilled in the art that the friction arrangement 74 can be constructed in different ways.

The inner ring portion 50 which is arranged in the axial direction between the driver disk 14 and the hub disk 12 is located radially opposite to a portion of the bearing ring 20 which is arranged between the driver disk 14 and the hub disk 12. In this way, an emergency guide is provided for the intermediate ring 42 in its radial inner region by means of the bearing ring 20. Since the intermediate ring 42 is held centrically with reference to the axis A when functioning correctly as a result of the torsion spring units arranged in the circumferential direction, there should not be any contact between the inner ring portion 50 and the bearing ring 20 in this normal state. However, if there is a malfunction in one of the spring units, this could lead to an asymmetrical radial force acting on the intermediate ring 42 with corresponding radial displacement. In this case, however, such a radial displacement is prevented by the emergency guide provided by the bearing ring 20.

Figure 6:
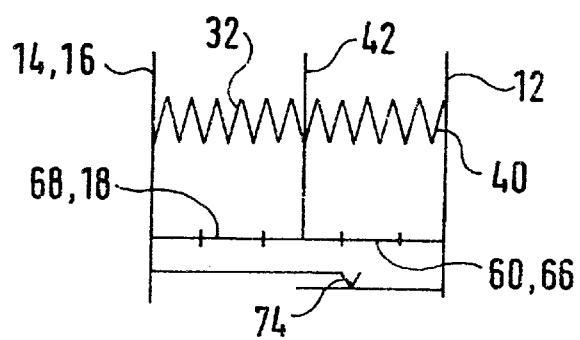
FIG. 6 shows a basic view for explaining the function of the torsional vibration damper according to the invention.

The manner of operation of the torsional vibration damper according to the invention will be described hereinafter especially with reference to FIGS. 3 and 6. FIG. 3 shows the intermediate ring 42 in its neutral, i.e., not loaded, position with respect to the hub disk 12 or driver disk 14 and cover plate 16. Now, if a torque effect occurs between the driver disk 14 and the cover plate 16 on the one hand and the hub disk 12 on the other hand, e.g., during the process of engaging the clutch, this results in a rotation of the driver disk 14 and cover plate 16 in the circumferential direction with respect to the hub disk 12. In so doing, the springs 32, 40 are compressed due to the contact at the control edges 34, 36, 38. It is assumed in the following that the springs 32, 40 have different spring constants; spring 32, for example, has a smaller spring constant. As a result of an increase in the torque effect, when the springs 32, 40 are connected in series, the spring having the smaller spring constant will first be compressed more strongly. That is, while the spring 40 remains virtually in its initial state, spring 32 is first compressed until the stop faces 60 and 66 come into contact with one another at the hub disk 12 and the intermediate ring 42. For this purpose, the construction is so selected that when such mutual contact between the stop faces 60, 66 takes place, the spring 32 is not yet fully compressed so that the spring is protected from damage. If the torque increases further, the second spring 40 is also compressed, as the case may be, until the stop faces 68 come into contact at the pin 18. Also, the construction is so configured that the spring 40 is not yet fully compressed during such mutual contact between the stop faces 68 and the pin 18. In this state, further rotation between the hub disk 12 and the driver disk 14 and cover plate 16 is no longer possible. During this rotation between the hub disk 12 and driver disk 14 and the cover plate 16, a stepped spring force action is provided due to the fact that the spring constants are different for springs 32 and 40, resulting in a correspondingly stepped damping of torsional vibrations. A correspondingly stepped spring force action occurs when the springs 32, 40 relax, wherein the spring with the greatest spring constant, i.e., spring 40, is first relaxed and only then is spring 32 relaxed. The friction arrangement 74 results in that the occurring torsional vibrations are damped in a suitable manner.

Notwithstanding the use of shorter springs 32, 40, the torsional vibration damper according to the invention provides a damping action which can normally be achieved by the use of longer springs whose length essentially conforms to the overall length of springs 32 and 40. This offers the advantage that a longer spring damping path can be provided. Nevertheless, because of the use of shorter springs 32, 40, the springs are prevented from deflecting outward radially in their middle region due to their pretensioning and from contacting portions of the hub disk 12 and the driver disk 14 and the cover plate 16, which portions define the respective spring windows in the radial outward direction. Accordingly, additional frictional contacts of the springs can be avoided so that a defined torsional vibration damping state can be produced. As will be seen in FIG. 3 in particular, the control edges 58 are arranged at the intermediate ring 42 on one side and the respective associated control edges 34, 36, 38 are arranged at the hub disk 12 and driver disk 14 and cover plate 16 on the other side so as to extend substantially parallel to one another. As a result, springs 32 or 40 which are compressed between the control edges 58 or 34, 36, 38 which face one another in the circumferential direction are substantially compressed in a straight line. This arrangement of the respective control edges in such a position relative to one another is made possible by the relatively short configuration of the springs arranged between the control edges and accordingly by the relatively short circumferential distance between the control edges. Also, this positioning of the control edges relative to one another helps to prevent a deflecting movement of the springs out of the longitudinal axis of the springs.

In order to prevent a deflection of the springs 32, 40 in their region contacting the corresponding spring contact arm 54 of the intermediate ring 42, the circumferential projections 64 which also have the stop faces 66, 68 form radial movement restraining means for the springs 32, 40. It is accordingly ensured that these springs 32, 40 will contact the hub disk 12 or the driver disk 14 and the cover plate 16 on the one hand and the intermediate ring 42 on the other hand only in their oppositely directed end regions. There is no contact between the middle region of the springs 32, 40 in the circumferential direction and the radial outer regions of the hub disk 12 or driver disk 14 and the cover plate 16. The intermediate ring 42 accordingly has the function of spring force deflection in the region of its spring contact arm 54, which leads to the advantages mentioned above.

Although the springs 32, 34 are shown in FIG. 3 only in one of the spring windows 26 of the hub disk 12, it goes without saying that such springs are also to be provided in the other spring windows 26. Further, it is possible to use springs with the same spring constants for the springs 32, 40, wherein a damping behavior is also obtained which substantially corresponds to the spring having an overall length substantially corresponding to the combined length of the two springs 32, 40.

Moreover, it is possible to construct the intermediate ring 42 in such a way that it has only the inner ring portion 50 and the outer ring portion 52 is omitted in its regions between the circumferential projections 64 with the respective stop faces 66 and 68. This results in a lighter structural component part which is inexpensive to produce. Further, it is possible that the rotational movement limiting means act directly between the hub disk 12 and the driver disk 14 or cover plate 16 without the intermediary of the intermediate ring 42.

Figure 7:
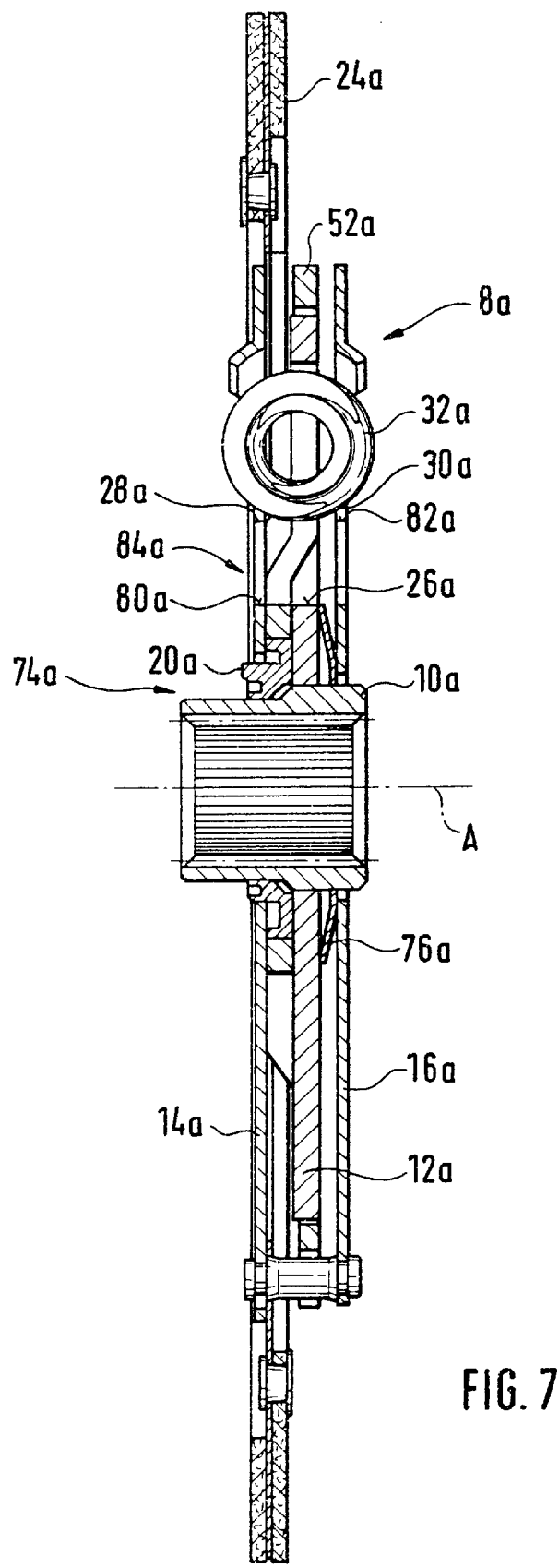
FIG. 7 shows a view of an alternative embodiment of the torsional vibration damper according to the invention corresponding to FIG. 1.

Another embodiment of the torsional vibration damper according to the invention will be described hereinafter with reference to FIG. 7. Structural component parts corresponding to those structural component parts which were shown and described above with reference to FIGS. 1 to 6 have the same reference numbers with "a" added at the end. The construction of the embodiment according to FIG. 7 substantially corresponds to the construction of the embodiment according to FIGS. 1 to 6, so only the differences will be discussed. In particular, in the configuration according to FIG. 7, the spring windows 26a are formed in the hub disk 12 so that rather than ending directly radially inside the springs 32a, they extend farther radially inwards. In a corresponding radial region, through-openings 80a, 82a are then formed in the driver disk 14a or the cover plate 16a. Thus, a through-opening 84a extending in the axial direction is formed by the spring window 26a in the hub disk 12a, which spring window 26a is lengthened radially inward, and by the through-openings 80a, 82a in the driver disk 14a and the cover plate 16a, this through-opening 84a being further aligned with respective spring windows in the intermediate ring. The driver disk 14a and the cover plate 16a then form a guide or support for the springs in the radial inner regions of their spring windows. In modern vehicle construction, motor vehicle clutches in particular are often delivered as preassembled structural assemblies comprising the flywheel, clutch housing, contact pressing plate assembly and clutch disk. Such clutch units must then be attached to a crankshaft of an internal combustion engine. This can be effected, e.g., by means of screw bolts penetrating the flywheel. In order to obtain access for screwing the screw bolts through the flywheel in an assembled clutch unit of this type, through-openings extending in axial direction are provided at the clutch housing or contact pressing plate assembly (not shown) on the one hand; on the other hand, as is shown in FIG. 7, the through-openings 84a are provided in the clutch disk 8a to enable the screw bolts to pass through without hindrance. The quantity of through-openings 84a provided in the circumferential direction can be selected corresponding to the through-openings provided in a respective flywheel for screw bolts.

Although the provided through-openings 84a have been primarily described in connection with a torsional vibration damper which is constructed in accordance with the present invention, it is self-evident for one skilled in the art that such through-openings 84a can also be provided in torsional vibration dampers of different constructions and that providing such through-openings is an aspect capable of independent protection.

Additional embodiments of the torsional vibration damper according to the invention are described hereinafter with reference to FIGS. 8 to 11. Structural component parts which correspond to the structural component parts shown in FIGS. 1 to 6 are described and shown with the same reference numbers, but with "b", "c", "d" or "e" added at the end.

Figure 8:
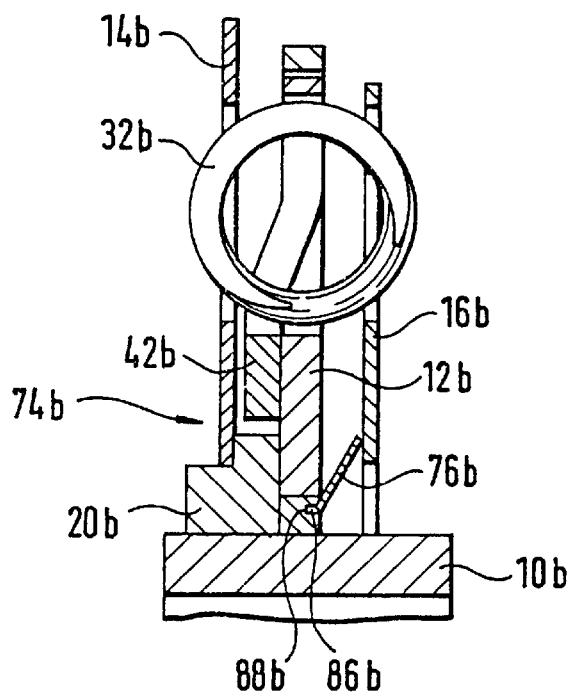
FIGS. 8 to 11 show additional embodiments of the torsional vibration damper according to the invention.

The construction of the torsional vibration damper in FIG. 8 substantially corresponds to the construction shown in FIGS. 1 to 6. As will be seen in FIG. 8, however, the plate spring 76b is constructed so that it contacts the hub disk 12b in its radial inner region and contacts the cover plate 16b by its radial outer region. In its radial inner region, the plate spring 76b has axial projections 86b which engage in corresponding recesses 88b in the hub disk 12b. These recesses 88b in the hub disk 12b can be prefabricated, e.g., when the hub disk 12b is punched out of a sheet metal part. The plate spring 76b is accordingly coupled with the hub disk 12b so as to be fixed with respect to rotation relative to it. As a result, frictional contact is provided on the one hand by the contact between the bearing ring 20b and the hub disk 12, possibly with the intermediary of friction means, during the relative rotation between the hub disk 12b and the driver disk 14b and the cover plate 16b, and, on the other hand, a frictional contact is provided between the plate spring 76b and the cover plate 16b, which plate spring 76b is connected with the hub disk 12b so as to be fixed with respect to rotation relative to it. As a result of suitable selection of material (metal, plastic or the like) of the plate spring 76b or the bearing ring 20b or of friction linings, if any, the required damping moment can be adjusted in a suitable manner. Although it is not shown in FIG. 8, it is further possible to connect the plate spring 76b with the cover plate 16b in a corresponding manner so that the plate spring 76b is fixed with respect to rotation relative to the cover plate 16b so that frictional contact is produced between the plate spring 76b and the hub disk 12b. Moreover, it is possible for the plate spring 76b to be supported with the intermediary of pressure disks or the like at the structural component part which is rotatable relative thereto in order to exert influence on the friction moment in addition by the selection of material for the pressure disk (metal, plastic or the like). Further, the plate spring 76b can be curved or suitably shaped in the region by which it contacts the structural component part which is rotatable relative thereto in order to be able to adjust the friction force provided by the plate spring 76b.

Figure 9:
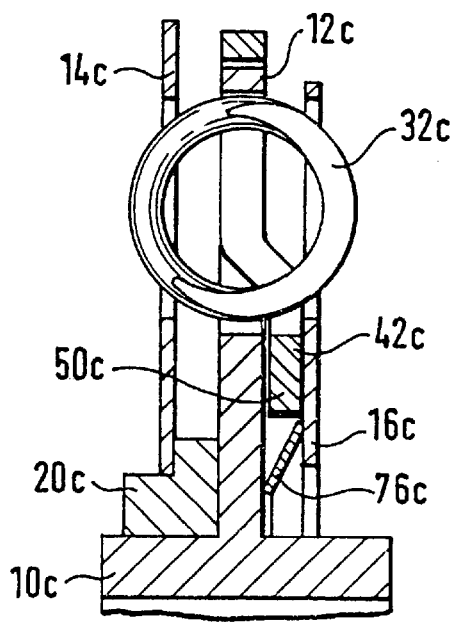

In the configuration according to FIG. 9, the inner ring portion 50c of the intermediate ring 42c lies in the axial direction between the hub disk 12c and the cover plate 16c. The driver disk 14c is pretensioned by the plate spring 76c via the bearing ring 20c against the hub disk 12c, possibly with the intermediary of friction linings or suitable friction means. This construction has the following advantage over the construction according to FIGS. 1 to 8: In the construction according to FIGS. 1 to 8, it is possible that when the friction linings provided between the bearing ring and hub disk or the bearing ring itself become worn and an axial movement of the driver disk toward the hub disk occurs as a result, the intermediate ring will jam in the region of its inner ring portion between the driver disk and hub disk and will lose its ability to rotate freely. This is prevented in the construction according to FIG. 9, since a clamping of the intermediate ring 42c in the region of its inner ring portion 50c can not occur in the event of wear in the region of contact of the bearing ring 20c at the hub disk 12c.

In the constructions according to FIGS. 1 to 9, the hub disk 12 is so constructed in each instance that it is planar, whereas the intermediate ring is curved in its central region. This has the advantage that standard structural component parts can be used for the hub disk and then welded or otherwise connected with the hub in a manner known per se. When welding the hub disk with the hub and at the high temperature which occurs at the hub disk during the welding, changes in a curved region thereof can be prevented due to the planar construction of the hub disk. There is also no need for the hub disk to be tempered after bending and welding with the hub, as the case may be.

Figure 10:
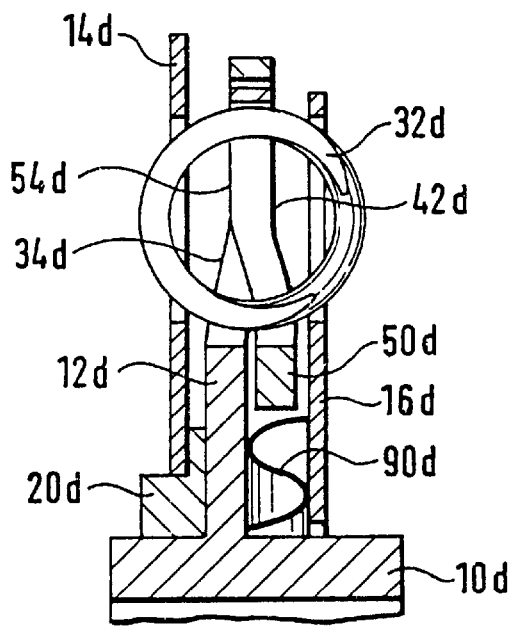

In the configuration according to FIG. 10, the hub disk 12d as well as the intermediate ring 42d are curved toward one another in their radial central regions in which the spring windows are provided. This leads to the advantage that the contact points of the intermediate ring 42d in the region of its spring contact arms 54d and the contact points of the hub disk 12d in the region of its control edges 34d with the springs can be arranged in the axial direction with respect to the center axis of the springs with improved symmetry. As a result, axially directed force components of the springs and tilting moments can be prevented. In the embodiment according to FIG. 10, a wave spring 90d is provided for pretensioning the driver disk 14d against the hub disk 12d via the bearing ring 20d. However, it is self-evident that other suitable springs or spring arrangements can be used in all embodiments of the present invention instead of the plate spring or wave spring shown herein.

Figure 11:
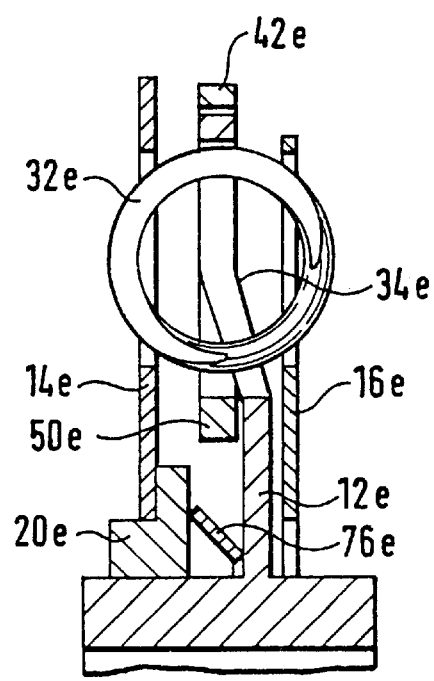
Figure 12:
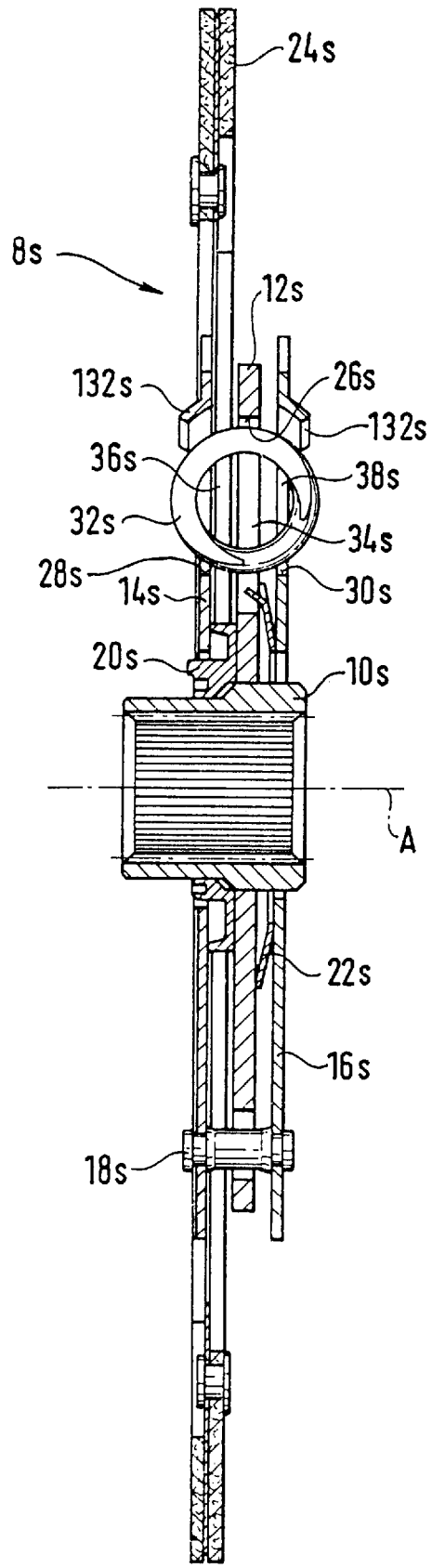
FIG. 12 shows a view of a torsional vibration damper according to the prior art corresponding to FIG. 1.

In the construction according to FIG. 11, a substantially planar intermediate ring 42e is provided. In this construction, the hub disk 12e is curved in the region of its control edges 34e in the axial direction toward the intermediate ring 42e. In this construction, the spring 76e is arranged between the hub disk 12e and the bearing ring 20e so that the bearing ring 20e with the driver disk 14e is pushed away from the hub disk 12e. In so doing, the cover plate 16e comes into contact with the hub disk 12e, so that the required friction moment for damping torsional vibrations is generated. Although it is not shown in FIG. 11, it is possible to provide friction linings or a suitable friction arrangement between the cover plate 16e and the hub disk 12e in order to be able to provide suitable frictional forces for the respective requirements.

In the construction according to FIG. 11, a clamping of the intermediate ring 42e can also be prevented in the event of wear in the region of the friction linings or in the event of contact between the cover plate 16e and the hub disk 12e, since the inner ring portion 50e is arranged in the axial direction between the driver disk 14e and the hub disk 12e and the driver disk 14e is pressed away from the hub disk 12e by the spring 76e in the event of wear.

Figure 13:
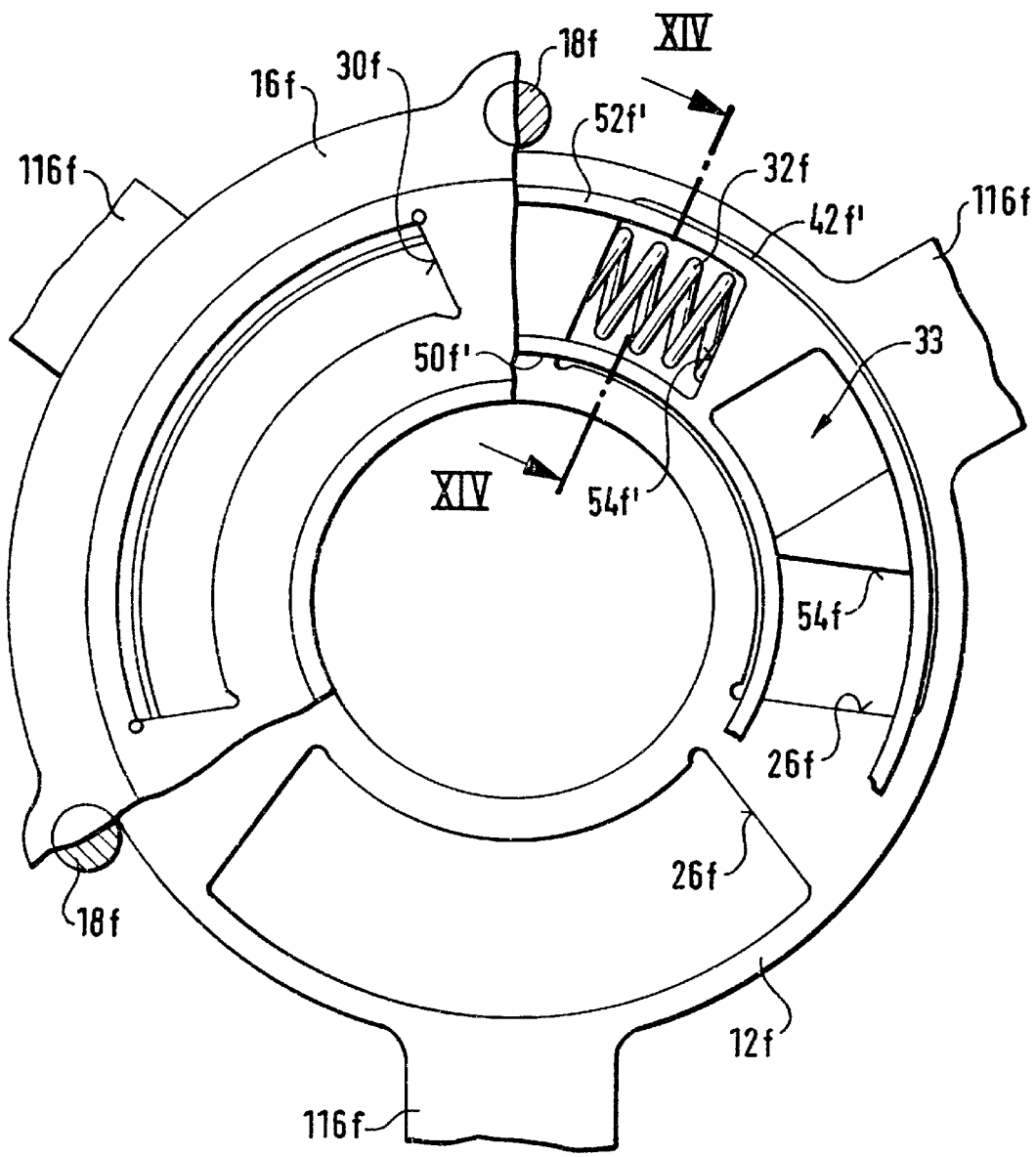
FIG. 13 shows a schematic top view of another embodiment of the torsional vibration damper according to the invention in connection with a two-mass flywheel.
Figure 14:
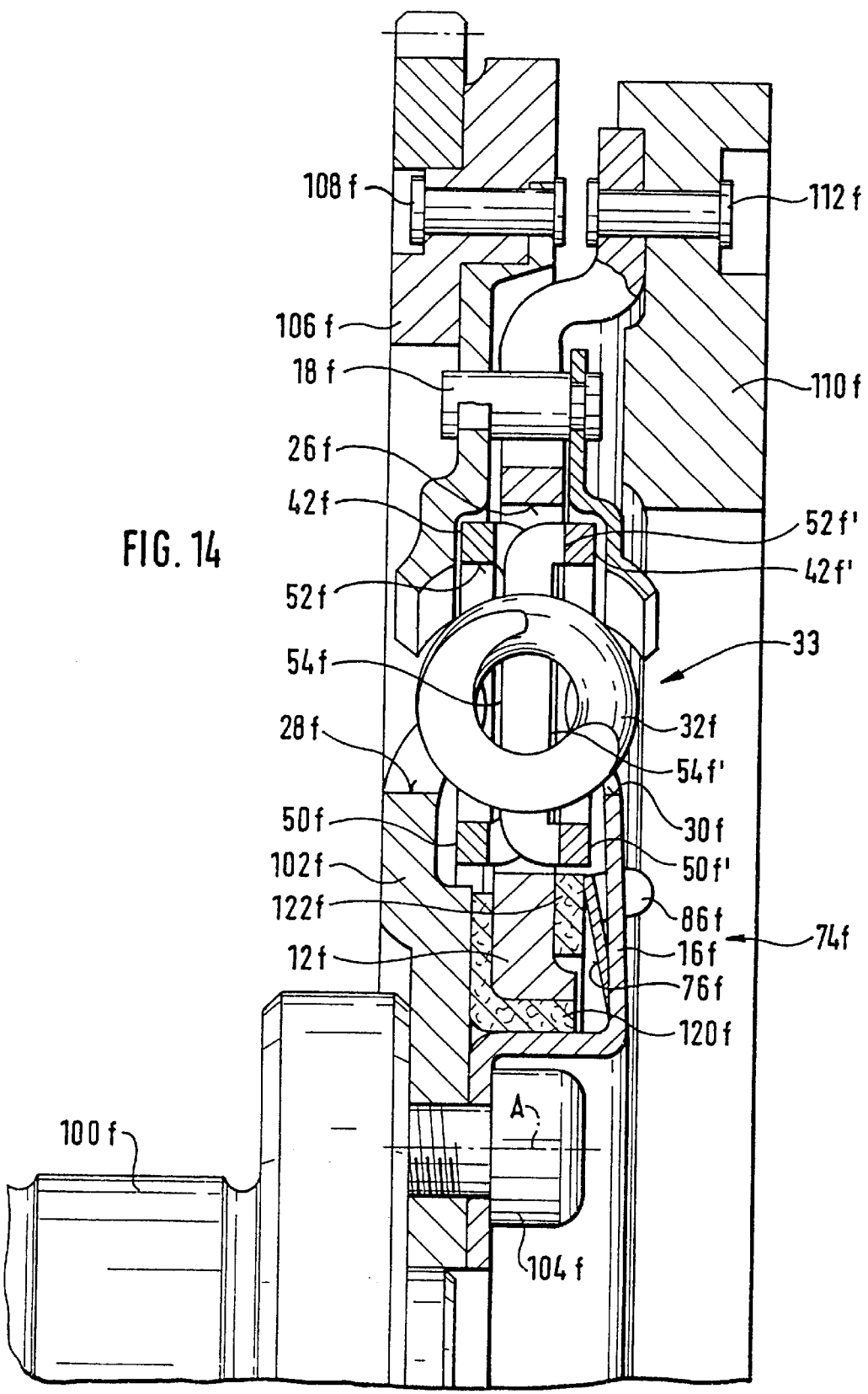
FIG. 14 shows a section along a line XIV—XIV in FIG. 13.
Figure 15:
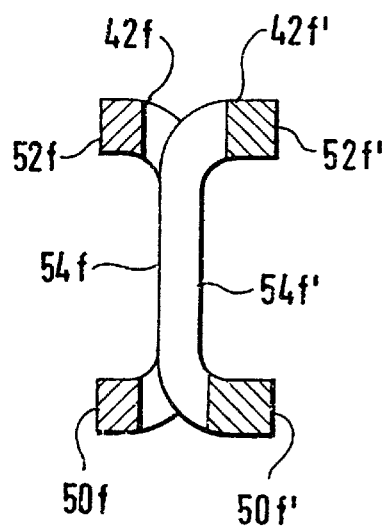
FIG. 15 shows a cross-sectional view of the intermediate ring elements in the torsional vibration damper shown in FIGS. 13 and 14.

Another embodiment of a torsional vibration damper according to the invention is shown in FIGS. 13 to 15. Structural component parts corresponding to those in the embodiment described with reference to FIGS. 1 to 6 are designated by the same reference numbers with an added "f". In particular, the torsional vibration damper according to the invention is shown in FIGS. 13 to 15 in connection with a two-mass flywheel. The two-mass flywheel comprises a primary plate 102f which is fixedly attached to an engine output shaft 10f, for example, and a cover plate 16f which is fixedly connected with the primary plate 102f and is arranged at a distance axially therefrom. In particular, the cover plate 16f is fixedly connected with the primary plate 102f in a radial inner region by pins 104f by means of which, further, the primary plate 102f is attached to the engine output shaft 100f. In the radial outer region, the cover plate 16f is fixedly connected with the primary plate 102f by pins 18f.

A hub disk 12f is arranged between the primary plate 102f and the cover plate 16f so as to be rotatable with respect to the primary plate 102f and the cover plate 16f. In a radial outer region, the primary plate 102f is fixedly connected with a first flywheel mass part 106f by pins 108f. The hub disk 12f is fixedly connected with a second flywheel mass part 110f again by pins 112f in its radial outer region.

In the hub disk 12f, the primary plate 102f, and the cover plate 16f, three spring windows 26f, 28f, 30f are arranged following one another in the circumferential direction. Each of these spring windows serves to receive a torsion spring unit 33. As will be seen in particular from FIG. 13, the spring windows 26f, 28f, 30f are so constructed in each instance that three springs can be arranged in the latter so as to follow one another in the circumferential direction (only one spring 32f of the torsion spring unit 33 is shown in FIGS. 13 and 14).

Further, the torsional vibration damper comprises two intermediate rings 42f and 42f'. Each of the intermediate rings 42f, 42f' has a spring contact arm 54f and 54f' for each torsion spring unit 33. As will be seen especially in FIG. 14, the spring contact arms 54f, 54f' are constructed so that they extend in a plane extending orthogonal to the axis of rotation A together with the hub disk 12f. In its radial end regions which lie near radial end regions of the spring window 26f of the hub disk 12f, the spring contact arms 54f, 54f' are curved so that an inner ring portion 50f and an outer ring portion 52f of the intermediate ring 42f are arranged to the left of the hub disk 12f in the axial direction in the view shown in FIG. 14 and the corresponding inner and outer ring portions 50f' and 52f' of the intermediate ring 42f' in the view in FIG. 14 are arranged at the right-hand side of the hub disk 12f. Accordingly, the two intermediate rings 42f, 42f' are rotatable relative to one another and there is no reciprocal interference between the inner and outer ring portions of the different intermediate rings.

Figure 23:
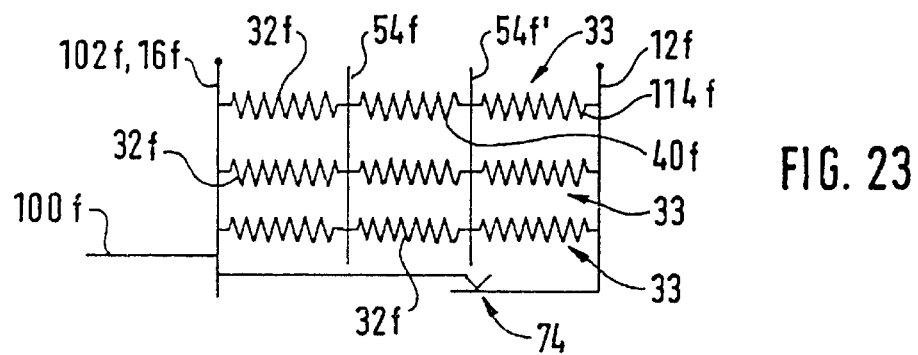
FIG. 23 shows a mechanical equivalent circuit diagram of a torsional vibration damper with three torsion springs, each of which comprises three springs.

FIG. 23 shows a mechanical equivalent circuit diagram of a torsional vibration damper of this type with three torsion spring units 33 which have three springs 32f, 40f and 114f in each instance. A damping of torsional vibrations is provided directly between the primary plate 102f and the cover plate 16f and the hub disk 12f by means of each of the torsion spring units 33 by the springs 32f, 40f, 114f with the intermediary of the spring contact arms 54f, 54f' of the two intermediate rings 42f, 42f', wherein the springs 32f, 40f, 114f are connected in series.

The manner of operation of a torsional vibration damper constructed in this way corresponds essentially to the operation described in the preceding with reference to FIGS. 1 to 6, for which reason a detailed description is dispensed with here.

Also, in the torsional vibration damper shown in FIGS. 13 to 15, rotational path limiting means are again provided between the hub disk 12f on one side and the primary plate 102f and the cover plate 16f on the other side. As will be seen especially in FIGS. 13 and 14, the hub disk 12f has three connection portions 116f extending radially outward which serve to connect the hub disk 12f with the second flywheel mass part 112f. The three connection portions 116f are spaced at an angle of 120° from one another. In a corresponding manner, the primary plate 102f and the cover plate 16f are connected by three pins 18f which are arranged at an angular distance of 120° relative to one another. At the occurrence of relative rotation between the hub disk 12f and the primary plate 102f and the cover plate 16f, the connection portion 116f contacts the respective pin 18f when a determined rotational angle is exceeded (60° in the illustrated embodiment), thus preventing further rotation. In particular, the construction is so configured that the springs 32f, 40f and 114f of the torsion spring units 33 are not maximally compressed when the connection portions 116f and the pins 18f contact one another. Of course, it is possible in a corresponding manner to provide rotational path limiting means constructed in another manner. For example, it is possible to provide first rotational path limiting means which limit the relative rotation between the hub disk and the intermediate ring 42f, second rotational path limiting means which limit a relative rotation between the intermediate rings 42f and 42f', and third rotational path limiting means which define the rotational path between the intermediate ring 42f' and the primary plate 102f and the cover plate 16f. In a construction of this kind, it is possible to provide different spring constants for the three springs of each torsion spring unit 33 so that a stepped damping behavior can be provided in turn.

As will be seen especially in FIG. 14, the intermediate rings 42f and 42f' are secured against radial displacement as well as against axial displacement. The radial securing means are provided in that the spring contact arms 54f, 54f' are curved near the radial ends of the spring windows 26f in each instance, so that their curved regions contact the radial end faces of the spring windows 26f during radial displacement. An axial securing is provided in that the inner and outer ring portion 50f, 52f of the intermediate ring 42f are held between the hub disk 12f and the primary plate 102f. In a corresponding manner, the intermediate ring 42f' or its inner and outer ring portions 50f', 52f ' are held axially between the hub disk 12f and the cover plate 16f.

In order to provide vibration damping between the hub disk 12f and the primary plate 102f and the cover plate 16f, a conventional friction arrangement 74f is again provided. The friction arrangement 74f is formed by a first friction ring 120f by means of which the hub disk 12f is supported at a radial inner region of the primary plate 102f in the axial direction and is also guided radially, and by a second friction ring 122f which is arranged between the hub disk 12f and a plate spring 76f, by means of which the hub disk 112f is pretensioned toward the primary plate 102f. Axially extending projections or shoulders 86f are provided at the plate spring 76f and engage in corresponding recesses in the cover plate 16f so that the plate spring 76f and cover plate 16f are connected so as to be fixed with respect to rotation relative to one another. Further, it is self-evident for the person skilled in the art that he can carry out this friction arrangement 74f in various forms adapted to special requirements.

Figure 16:
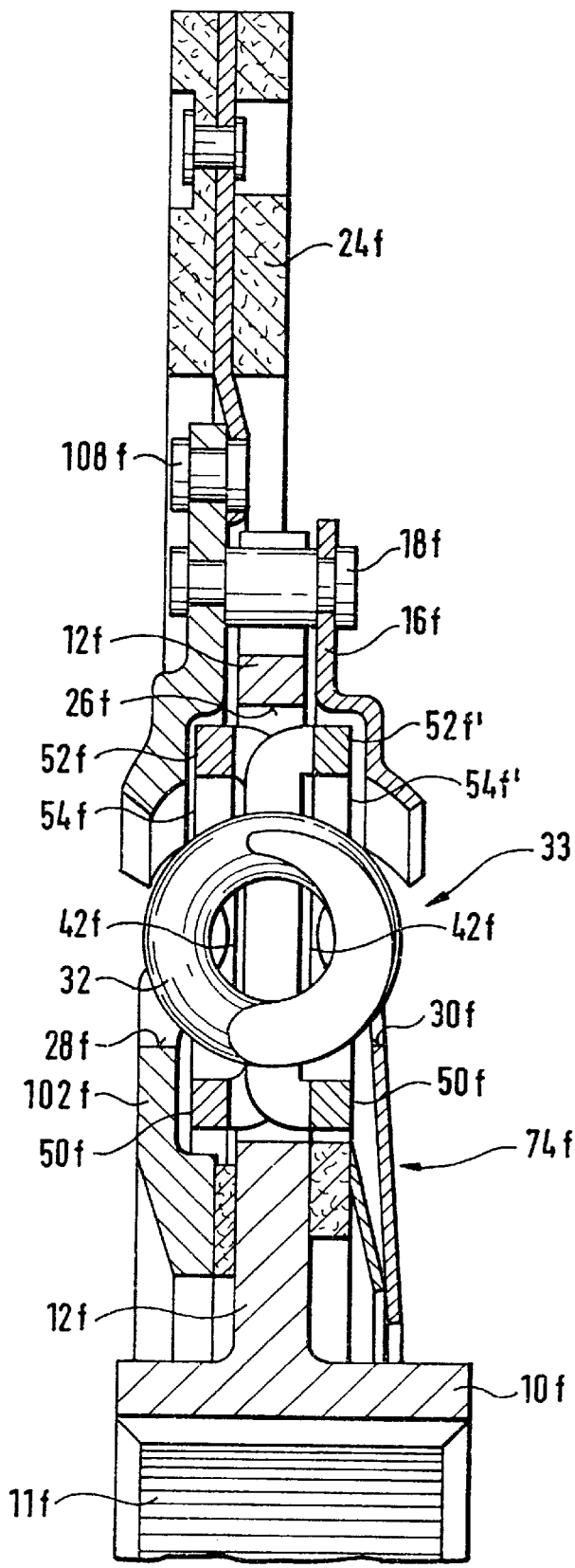
FIG. 16 shows the torsional vibration damper shown in FIGS. 13 and 14 used in a clutch disk.

The torsional vibration damper shown in FIGS. 13 to 15 is shown in FIG. 16 in connection with a clutch disk. The torsional vibration damper shown in FIG. 16 corresponds in function and construction to the torsional vibration damper shown in FIGS. 13 to 15, and reference is therefore had to the statements made above. Identical or corresponding structural component parts in FIGS. 13 to 15 and in FIG. 16 are designated by the same reference numbers. In the torsional vibration damper shown in FIG. 16, the primary plate 102f serves as a driver disk in whose radial outer region are arranged friction linings 24f of the clutch disk by means of pins 108f. These friction linings 24f can be clamped between corresponding friction linings of a flywheel and a contact pressing plate for torque transmission. The hub disk 12f is fixedly connected in its radial inner region with a hub 10f which has an inner toothing 11f and is coupled therewith with a transmission input shaft so as to be fixed with respect to rotation relative thereto, but axially displaceable.

Figure 17:
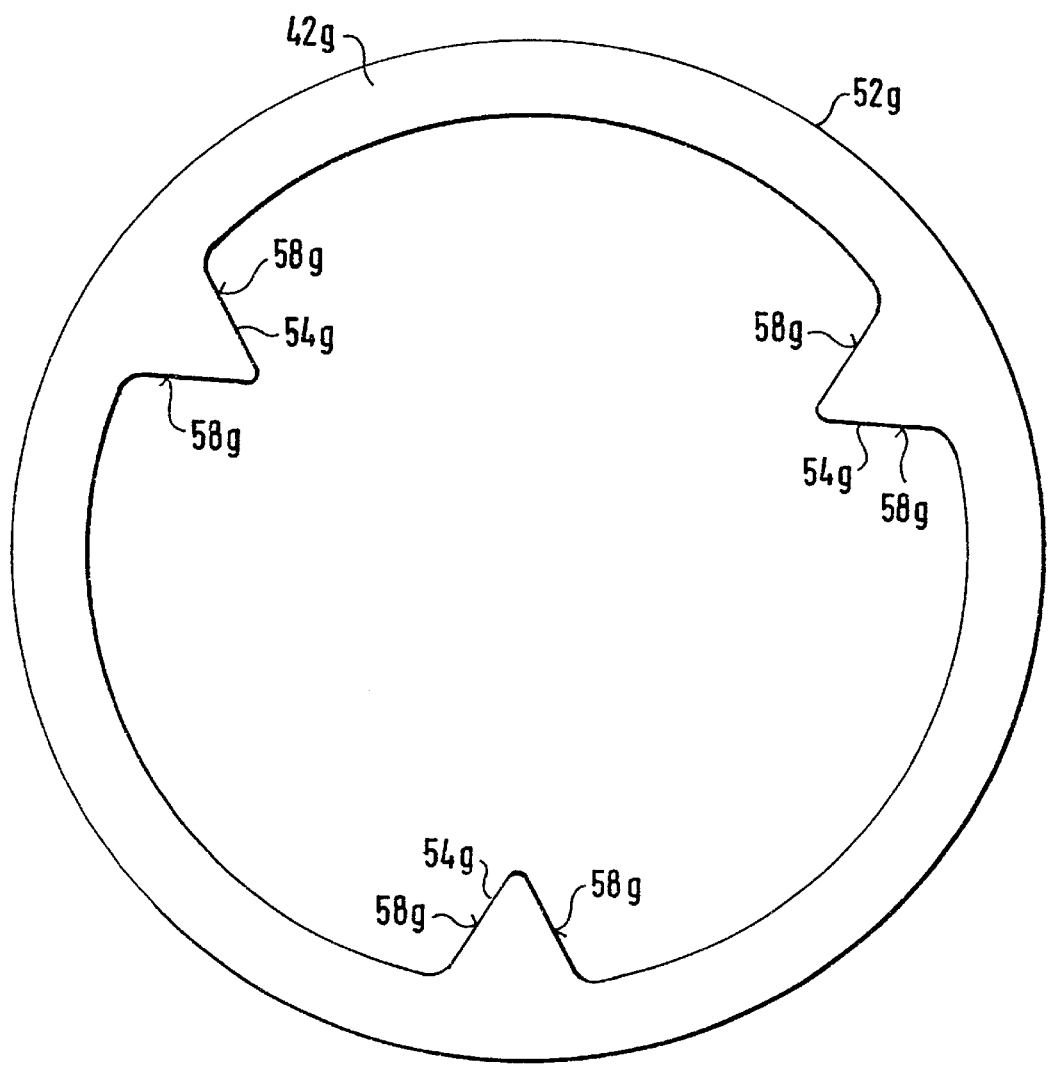
FIG. 17 shows a partial top view of an alternative intermediate ring element.
Figure 18:
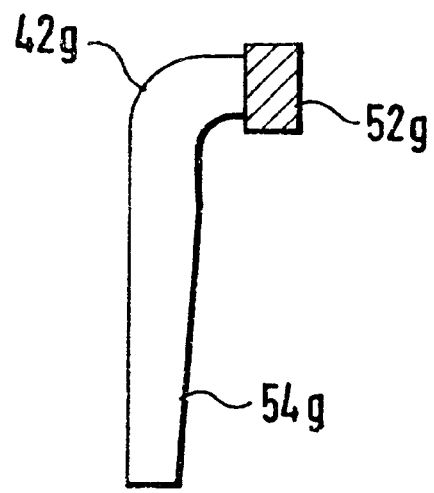
FIG. 18 shows a sectional view of an alternative intermediate ring element corresponding to FIG. 15.

FIGS. 17 and 18 show an additional embodiment of an intermediate ring 42g. The intermediate ring 42g has only one outer ring portion 52g, from which the spring contact arms 54g extend radially inward. As will be seen in particular in FIG. 17, the spring contact arms 54g are essentially constructed as contact wedges which taper to a point radially inward, so that the respective control edges 58g intersect in the inner vertex points. In a configuration of this kind, for example, in comparison with the embodiment shown in FIGS. 1 to 6, the two control edges 58g of every spring contact arm 54g are arranged closer to one another in the circumferential direction. This has the advantage that there is more spring volume available with identically long circumferential extension of the spring windows, so that the damping characteristic of a torsional vibration damper constructed with an intermediate ring or intermediate rings of this type can be made to correspond even more closely to the damping behavior of a torsional vibration damper constructed with very long springs. Nevertheless, the spring force is provided by individual, relatively short springs in the individual torsion spring units, so that a radially outward deflection of the springs in their longitudinal central region can also be prevented in such a construction. In order to provide a stable construction nevertheless, the outer ring portion 52g can be strengthened, for example, i.e., can be constructed from thicker material or the like.

Figure 19:
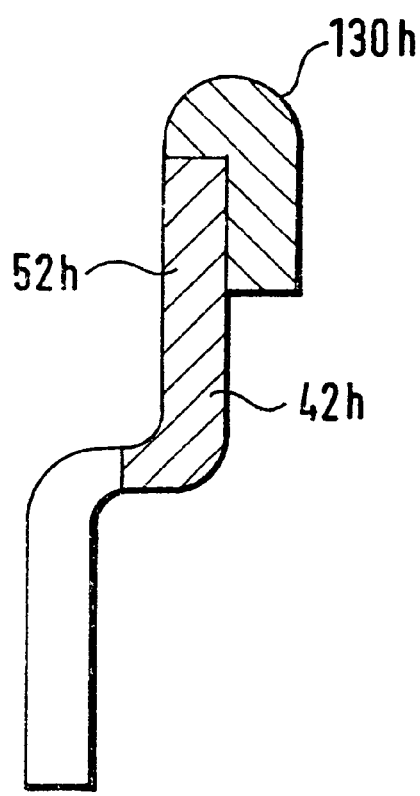
FIG. 19 shows a view corresponding to FIG. 18, wherein a vibration mass part is additionally arranged at the intermediate ring element.

FIG. 19 shows a construction of the intermediate ring 42h which substantially corresponds with respect to construction of the intermediate ring 42g shown in FIG. 17, but which can also assume any other configuration described in the preceding embodiments. A mass part 130h is arranged in a fixed manner at the outer ring portion 52h. As a result of this mass part 130h, the resonant frequency of a vibration system constructed with an intermediate ring 42h of this type is shifted to a suitable value so as to contribute additionally to the vibration damping. Further, the excitation of vibrations in an intermediate ring 42h with a mass part 130h of this type requires vibration energy which is then absorbed in this vibration system so that vibrations occurring in the force transmission path can be further intercepted.

Figure 20:
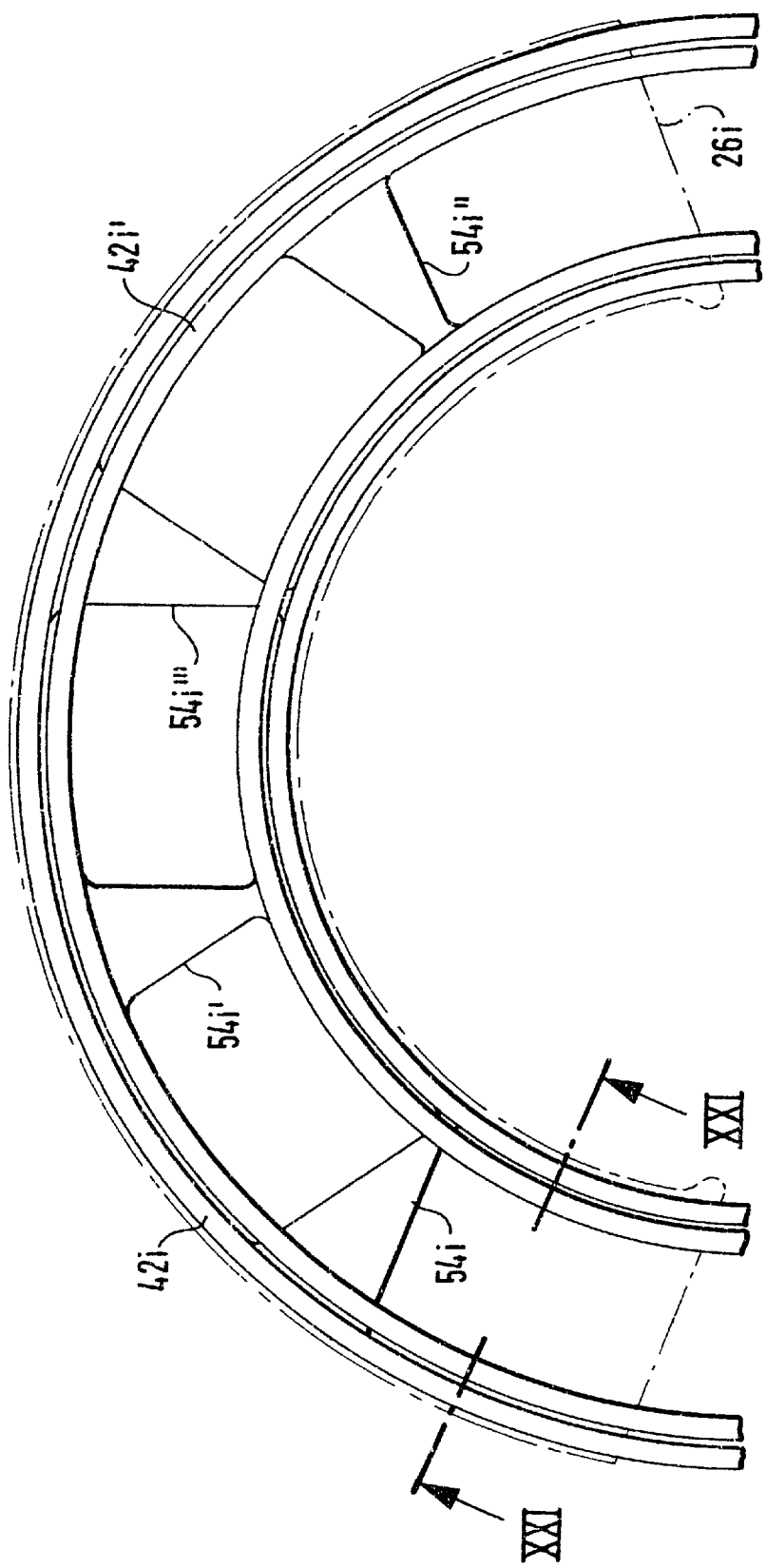
FIG. 20 shows a schematic top view of a spring window of a hub disk, wherein four intermediate ring elements with respective spring contact arms for a torsion spring unit are provided with five springs.
Figure 21:
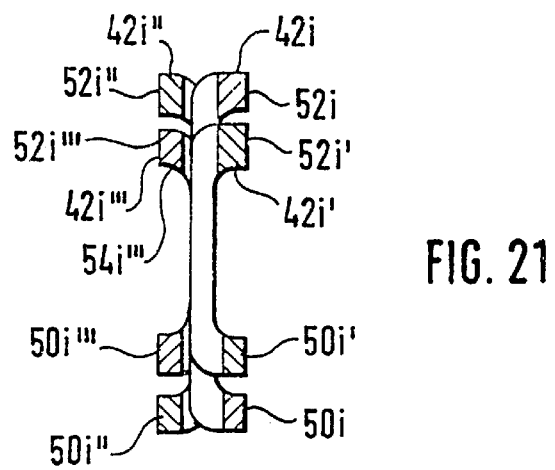
FIG. 21 shows a sectional view along line XXI—XXI in FIG. 20 which shows the intermediate ring element.

FIGS. 20 and 21 show schematic views of a torsional vibration damper according to the invention which substantially corresponds to the torsional vibration damper described above with reference to FIGS. 13 to 16 in terms of construction, so that reference is had to the fundamental principles of operation in the preceding description. FIG. 20 only shows the spring window 26i of a hub disk, not shown. The torsional vibration damper shown in FIGS. 20 and 21 is constructed with four intermediate rings 42i, 42i', 42i'', and 42i''', so that each torsion spring unit can comprise five springs. Each of the intermediate rings 42i, 42i', 42i'', and 42i''' has, in turn, a spring contact arm 54i, 54i', 54i'' and 54i''' for each torsion spring unit. In a construction of this kind, the damping behavior of a torsional vibration damper can be adapted still more to that of a torsional vibration damper constructed with very long springs, but without the danger of the torsion springs deflecting radially outward because of their pretensioning and a centrifugal force occurring in operation. Due to the relatively large extension in the circumferential direction, it is advantageous in a construction of this kind if the torsional vibration damper comprises only two torsion spring units with five torsion springs in each instance.

As will be seen in particular from FIG. 21, the spring contact arms 54i, 54i' of the intermediate rings 42i, 42i' are bent in their radial end regions axially in the same direction, and the spring contact arms 54i'' and 54i'.'' of the intermediate rings 42i'' and 42i' are bent axially in the opposite direction. As a result, the intermediate rings 42i, 42i' on the one hand and the intermediate rings 42i'' and 42i''' on the other hand are arranged one inside the other in the radial direction. Thus, an outer ring portion 52i or 52i'' of the intermediate rings 42i or 42i'' lies radially outside of the outer ring portions 52i' or 52i''' of the intermediate rings 42i' or 42i'''. In a corresponding manner, an inner ring portion 50i' or 50i''' of the intermediate rings 42i' or 42i''' lies radially outside of the corresponding inner ring portions 50i or 50i'' of the intermediate rings 42i or 42i''. Thus, the respective inner and outer ring portions of the different intermediate rings can also be prevented from interfering with one another in a configuration of this type, wherein, however, all spring contact arms 54i, 54i', 54i'' and 54i''' lie in a common plane with the associated hub disk.

Figure 22:
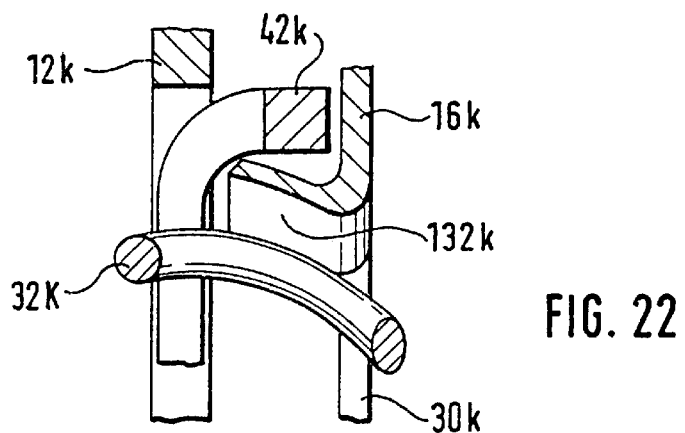
FIG. 22 shows another embodiment of the torsional vibration damper according to the invention.

FIG. 22 shows another construction of a torsional vibration damper according to the invention. In this torsional vibration damper, axial installation space for receiving an intermediate ring 42k is provided in the axial direction between the hub disk 12k and the cover plate 16k (in a manner corresponding to the driver disk). A spring positioning flange 132k which is bent axially in the direction of the hub disk 12k is provided at the cover plate 16k in the region of the radial limiting of its spring window 30k, this spring positioning flange 132k corresponding to spring positioning flanges 132, known per se, in FIG. 1 with respect to function. By means of this spring positioning flange 132k which is provided at the cover plate 16k on the one hand and at the driver disk (not shown) on the other hand, the spring 32k is positioned so that it can not deflect in the axial direction and is accordingly held in its appropriate position. In the embodiment shown in FIG. 22, it is possible to use the intermediate ring shown in FIG. 19 with the mass part 130h, since sufficient installation space for arranging the mass part 130h is provided between the cover plate 16k and the hub disk 12k.

In the torsional vibration damper according to the invention described in the preceding, the respective springs of the different torsion spring units are relatively short. However, the springs of a torsion spring unit work together in such a way that they provide a spring characteristic corresponding to that of a long spring. However, by providing short springs, the problem of radial buckling of the springs in their longitudinal center is extensively eliminated, so that lubricated spring guides can be omitted in the torsional vibration damper according to the invention. The torsional vibration damper according to the invention accordingly dispenses with all requirements or problems arising in particular with respect to the sealing of such lubricated spring guides.

Since the outward buckling can be prevented even at relatively high speeds in springs which are short and accordingly have a relatively low inherent weight, the installation space provided for the springs of the respective torsion spring units can be limited substantially to the spring volume itself. No additional installation space need be reserved for receiving deflecting springs. In the event that a spring contacts the hub disk or driver disk or cover plate in its radial outer region at very high speeds, this also results in practically no wear, since the contact pressure of the springs is only relatively small during such contact because of the relatively low inherent weight of the spring.

It is self-evident for persons skilled in the art that the features of different component groups with reference to the different embodiments, e.g., with respect to the arrangement of the plate spring or inner ring portion of the intermediate ring, can be combined. In the construction according to FIG. 11, for example, axial projections can also be provided at the spring 76e, which axial projections engage in the corresponding projections in the hub disk 12e and accordingly serve to couple the spring 76e with the hub disk 12e so that the latter are fixed with respect to rotation relative to one another.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A clutch disk, comprising:

a disk-shaped first damper part having a spring window with control edges;

a second damper part which includes a plurality of disks and is rotatable about an axis with respect to the first damper part and has a spring window, with control edges, corresponding to the spring window of the first damper part;

at least one torsion spring unit, the at least one torsion spring unit includes at least two springs which are arranged in series circumferentially in the windows in the damper parts, the torsion spring unit having ends directed opposite to one another in the circumferential direction, which ends cooperate with the control edges of the windows of the first damper part and the second damper part for damping torsional vibrations;

at least one intermediate ring element rotatable about the axis with respect to the first damper part and the second damper part, the intermediate ring element having at least one spring contact arm for the at least one torsion spring unit, the spring contact arm being configured to extend substantially radially with respect to the axis, the at least one spring contact arm being arranged in the circumferential direction between mutually facing ends of the at least two springs of the at least one torsion spring unit, which ends face one another, the at least one intermediate ring element further including radial movement restraining means for protecting the at least two springs against movement in a radial outward direction in their end regions facing the at least one spring contact arm, the spring contact arm having ends that are oppositely directed in the circumferential direction, the ends of the contact arm being provided with control edges for contact with the springs;

rotational angular path limiting means for limiting a rotational path between the first damper part and the second damper part, the rotational path limiting means including a stop at the first damper part and a stop at the second damper part, which act in the circumferential direction;

a first stop provided at the intermediate ring element so as to cooperate with the stop at the first damper part, and a second stop provided at the intermediate ring element cooperating with the stop at the second damper part so that for each series connected spring a separate stroke limitation is provided for the spring located between mutually facing control edges, the stops of the first and second damper parts and the second stop being arranged to be effective in a spring area in which respective control edges of the contact arm and the second damper part move toward one another, and so as to limit a stroke of the spring area which is not compressed between control edges of the contact arm and the second damper part but is compressed between a second control edge of the contact arm and the control edges of the first damper part, the intermediate ring element comprising at least one of an inner ring portion arranged radially inside the at least one torsion spring unit and an outer ring portion arranged radially outside of the at least one torsion spring unit, the at least one spring contact arm being arranged to extend away from one of the inner and the outer ring portion substantially in the radial direction, the first damper part comprising a first disk element arranged axially adjacent to the second damper part, and a second disk element arranged axially on a side of the second damper part opposite to the first disk element, the second disk element being fixedly connected in a radially outer region with the first disk element, the at least one of the inner ring portion and the outer ring portion of the intermediate ring element being arranged axially between the second damper part and one of the first disk element and the second disk element of the first damper part;

a bearing ring element connected to a radially inner region of the first disk element so that the first disk element is fixed with respect to rotation relative to the bearing ring element, the inner ring portion of the intermediate ring element being arranged between the first disk element and the second damper part;

a friction arrangement configured to act between the second damper part and the first damper part so as to provide a torsional vibration damping frictional force, the second disk element being arranged to axially contact the second damper part; and spring means provided between the second damper part and the bearing ring element for pretensioning the second disk element toward the second damper part.

2. A clutch disk according to claim 1, wherein the radial movement restraining means includes projections which extend away from the at least one spring contact arm substantially in the circumferential direction in a radially outer end region of the control edges.

3. A clutch disk according to claim 1, wherein the at least one spring contact arm has a radial portion with at least some areas that lie in the axial direction in a common plane orthogonal to the axis with the control edges formed at the spring window of the second damper part, the radial portion being arranged to contact the springs of the torsion spring unit.

4. A clutch disk according to claim 3, wherein the intermediate ring element comprises at least the inner ring portion, the inner ring portion being arranged adjacent to a radial inner region of the second damper part in the axial direction.

5. A clutch disk according to claim 4, wherein the at least one intermediate ring element is curved in a region of the at least one spring contact arm from the inner ring portion radially outward in the axial direction toward the second damper part.

6. A clutch disk according to claim 1, wherein the second damper part is substantially planar.

7. A clutch disk according to claim 1, wherein the second damper part is curved radially outward in the axial direction toward the at least one intermediate ring element in a radial region corresponding to the at least one spring contact arm.

8. A clutch disk according to claim 4 wherein the at least one intermediate ring element is substantially planar, the second damper part being curved radially outward in the axial direction toward the at least one intermediate ring element in a radial region corresponding to the at least one spring contact arm.

9. A clutch disk according to claim 1, wherein the bearing ring element has a ring portion that extends axially between the first disk element and the second damper part so that an outer circumferential surface of the ring portion of the bearing ring element forms an emergency guide for the inner ring portion of the intermediate ring element.

10. A clutch disk according to claim 1, wherein the bearing ring element is arranged to axially contact the second damper part, and further comprising spring means provided between the second damper part and the second disk element for pretensioning the bearing ring element toward the second damper part.

11. A clutch disk according to claim 10, wherein the spring means includes a spring element formed as one of a plate spring, a ring spring, and a wave spring.

12. A clutch disk according to claim 11, wherein the spring element is arranged to contact the second damper part in a radial inner region and has at least one axially directed projection that engages in a corresponding recess in the radial inner region of the second damper part.

13. A clutch disk according to claim 1, wherein the first and second stops at the intermediate ring element include substantially radially directed stop faces which are formed at projections that extend away from each spring contact arm in the circumferential direction.

14. A clutch disk according to claim 1, wherein the stop at the first damper part is formed by at least one pin element that connects the first disk element with the second disk element.

15. A clutch disk according to claim 1, wherein the stop means at the second damper part includes substantially radially extending stop faces provided in a radially outer region of the second damper part.

16. A clutch disk according to claim 1, wherein the springs of the at least one torsion spring unit have equal spring constants.

17. A clutch disk according to claim 1, wherein the springs of the at least one torsion spring unit have different spring constants.

18. A clutch disk according to claim 3, wherein the first damper part comprises a first disk element arranged axially adjacent to the second damper part, and a second disk element arranged axially on a side of the second damper part opposite to the first disk element, the second disk element being fixedly connected in a radially outer region with the first disk element, the at least one of the inner ring portion and the outer ring portion of the intermediate ring element being arranged axially between the second damper part and one of the first disk element and the second disk element of the first damper part, the spring window in the second damper part being configured to extend farther radially inward than the corresponding spring windows in the first and second disk elements of the first damper part, the first and second disk elements having axially aligned through-openings in a region corresponding to a radially, inwardly lengthened portion of the spring window in the second damper part.

19. A clutch disk according to claim 1, wherein one of the first damper part and the second damper part comprises an input part of a clutch disk, and the other of the first damper part and the second damper part comprises an output part of the clutch disk.

20. A clutch disk according to claim 19, and further comprising a hub, the output part being fixed to the hub.

21. A clutch disk according to claim 20, wherein the first damper part includes a first disk element axially adjacent to the second damper part, and further comprising a bearing ring element connected to a radially inner region of the first disk element so that the first disk element is fixed with respect to rotation relative to the bearing ring element, the intermediate ring element having an inner ring portion arranged between the first disk element and the second damper part, the bearing ring element being mounted on the hub so as to be rotatable about the axis.

* * * * *